US012534645B2

(12) United States Patent

Tsuchimori et al.

(10) Patent No.: US 12,534,645 B2

(45) Date of Patent: Jan. 27, 2026

(54) TAPE CASSETTE INCLUDING TAPE AND COVER FILM, AND METHOD OF CREATING LABELS WITH THE TAPE CASSETTE

(71) Applicant: BROTHER KOGYO KABUSHIKI KAISHA, Nagoya (JP)

(72) Inventors: Shohei Tsuchimori, Nagoya (JP); Yuki Hokari, Nagoya (JP); Chie Nakashima, Nagoya (JP); Takahiro Norimatsu, Hekinan (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/019,326

(22) Filed: Sep. 13, 2020

(65) Prior Publication Data

US 2021/0095164 A1 Apr. 1, 2021

(30) Foreign Application Priority Data

Sep. 27, 2019 (JP) ................................ 2019-177066

(51) Int. Cl.

*C09J 7/29* (2018.01)
*B65C 3/02* (2006.01)
(Continued)

(52) U.S. Cl.

CPC .................. *C09J 7/29* (2018.01); *B65C 3/02* (2013.01); *B65C 9/0006* (2013.01); *B65C 9/26* (2013.01);
(Continued)

(58) Field of Classification Search

CPC ..... B41J 2/325; B41J 3/36; B41J 3/407; B41J 3/4075; B41J 15/044; B41J 17/32;
(Continued)

(56) References Cited

U.S. PATENT DOCUMENTS 5,593,241 A * 1/1997 Kawaguchi .............. C09J 7/405 400/613
7,357,585 B2 4/2008 Kurashina
(Continued)

FOREIGN PATENT DOCUMENTS

CN 101174314 A 5/2008
CN 102099845 A 6/2011
(Continued)

OTHER PUBLICATIONS

Machine Translation of JP 2016-071238 A (Year: 2016).*
(Continued)

*Primary Examiner* — Mark Ruthkosky
*Assistant Examiner* — Sathavaram I Reddy
(74) *Attorney, Agent, or Firm* — Kenealy Vaidya LLP

(57) ABSTRACT

A tape cassette includes a tape, a transparent cover film, and an ink ribbon. The tape has a thickness in a thickness direction and a width in a width direction. The tape is configured of a plurality of laminated layers including: a transparent base layer; a background layer having a width smaller than the width of the tape in the width direction; and a release layer constituting one surface of the tape in the thickness direction. The transparent cover film is to be bonded to the tape. The ink ribbon contains ink to be transferred to one of the tape and the cover film.

9 Claims, 20 Drawing Sheets

(51) Int. Cl.

| | |
|---|---|
| ***B65C 9/00*** | (2006.01) |
| ***B65C 9/26*** | (2006.01) |
| ***B65C 9/46*** | (2006.01) |
| ***C09J 7/20*** | (2018.01) |

(52) U.S. Cl.
CPC ................. *B65C 9/46* (2013.01); *C09J 7/201* (2018.01); *C09J 7/205* (2018.01); *C09J 2203/334* (2013.01)

(58) Field of Classification Search
CPC .......... B41J 35/28; B65C 3/02; B65C 9/0006; B65C 9/26; B65C 9/46; C09J 7/201; C09J 7/205; C09J 7/29; C09J 2203/334
See application file for complete search history.

(56) References Cited

U.S. PATENT DOCUMENTS

| | | | |
|---|---|---|---|
| 2004/0208682 | A1 | 10/2004 | Akaiwa et al. |
| 2006/0008608 | A1 | 1/2006 | Kurashina |
| 2008/0107854 | A1 | 5/2008 | Ito et al. |
| 2009/0277570 | A1 | 11/2009 | Caveney et al. |
| 2015/0375527 | A1 | 12/2015 | Torii |
| 2019/0105874 | A1 | 4/2019 | Yoshimura et al. |

FOREIGN PATENT DOCUMENTS

| | | | | | |
|---|---|---|---|---|---|
| EP | 2 974 870 | A2 | | 1/2016 | |
| EP | 3 467 064 | A1 | | 4/2019 | |
| JP | H07-112559 | A | | 5/1995 | |
| JP | 2004-216833 | A | | 8/2004 | |
| JP | 2016-10932 | A | | 1/2016 | |
| JP | 2016-071238 | A | | 5/2016 | |
| JP | 2018058925 | A | * | 4/2018 | ............ B41J 15/044 |
| JP | 2018-111314 | A | | 7/2018 | |
| JP | 2019-069531 | A | | 5/2019 | |

OTHER PUBLICATIONS

Machine Translation of JP 2018-058925 A1 (Year: 2018).*
Partial European Search Report for the related European Patent Application No. 20195307.2 dated Jan. 26, 2021.
Partial European Search Report for the related European Patent Application No. 20195307.2 dated Jun. 2, 2021.
Chinese Office Action for the related Chinese Patent Application No. 202011030624.X dated Feb. 3, 2023.
Japanese Office Action for the related Japanese Patent Application No. 2019-177066 dated Jun. 8, 2023.
Chinese Office Action for the related Chinese Patent Application No. 202011030624.X dated Aug. 12, 2023.

* cited by examiner

TAPE CASSETTE INCLUDING TAPE AND COVER FILM, AND METHOD OF CREATING LABELS WITH THE TAPE CASSETTE

CROSS REFERENCE TO RELATED APPLICATION

This application claims priority from Japanese Patent Application No. 2019-177066 filed Sep. 27, 2019. The entire content of the priority application is incorporated herein by reference.

TECHNICAL FIELD

The present disclosure relates to a tape cassette used for creating labels, and a method of creating such labels.

BACKGROUND

There is known a tape printer known in the art configured to perform printing on a print tape to generate a printed label. The printed label is then wrapped around an object (a labeling target) having a substantially circular cross section. For example, Japanese Patent Application Publication No. 2016-010932 discloses such a conventional tape printer. In this conventional tape printer, a display portion having printed text or the like (a printed part) is provided near one longitudinal end of the printed label (a self-laminating printed label). When wrapping the printed label around the object, first the longitudinal end of the printed label having the display portion is affixed to the object, and subsequently a remaining transparent portion on the other longitudinal end (a transparent film part) is wrapped continuously around the object.

SUMMARY

The above conventional technology may have the following limitation depending on the diameter of the object.

Specifically, after wrapping the printed label once around a circumference of the object, as described above, the remaining unwrapped portion may be relatively long if the object has a relatively small diameter. This remaining portion does not include the display portion described above and is visually transparent overall. Hence, by continuing to wrap the remaining portion around the object so as to cover the display portion, the remaining portion can protect the display portion from becoming dirty or peeling due to rubbing (while still allowing the display portion to be visually recognizable), for example.

On the other hand, if the object has a relatively large diameter, the length of the unwrapped portion remaining after the printed label has been wrapped once around the object is relatively short. Consequently, when the remaining portion is wrapped about the object, this portion may be unable to cover the entire display portion and in such cases will be unable to protect the display portion from becoming dirty or peeling due to rubbing, as described above.

Therefore, the labels printed using the conventional technology cannot be affixed to objects having too large of a diameter, since the display portion of the printed label will not be protected from dirt or peeling. In other words, the applications of the conventional print labels are limited by diametric sizes of the objects to which the conventional print labels will be affixed.

In view of the foregoing, it is an object of the disclosure to provide a tape cassette and a method of creating labels that can greatly expand the diametric range of applicable objects to which the printed labels can be affixed.

In order to attain the above and other objects, according to one aspect, the disclosure provides a tape cassette including: a tape having a thickness in a thickness direction and a width in a width direction; a transparent cover film to be bonded to the tape; and an ink ribbon containing ink to be transferred to one of the tape and the cover film. The tape is configured of a plurality of laminated layers including: a transparent base layer, a background layer having a width smaller than the width of the tape in the width direction; and a release layer constituting one surface of the tape in the thickness direction.

According to another aspect, the disclosure also provides a method of creating a label with the above tape cassette and a label-creating device. The method includes: mounting the above tape cassette on the label-creating device; transferring the ink of the ink ribbon to the one of the tape and the cover film to form an image thereon; and bonding the tape and the cover film together to create the label having the image formed therein.

According to still another aspect, the disclosure also provides a method of attaching the label created by the above method to an object having a generally circular cross-section. The label has a first end portion and a second end portion opposite each other in a longitudinal direction thereof, the first end portion being closer to the image than the second end portion is to the image in the longitudinal direction. The method includes: peeling the release layer off the label; wrapping the first end portion around the object; and continuously wrapping the second end portion around the object to overlap with the first end portion in a radial direction of the object.

According to still another aspect, the disclosure provides a tape cassette including: a tape; a transparent cover film to be bonded to the tape; and an ink ribbon containing ink to be transferred to one of the tape and the cover film. The tape is configured of a plurality of laminated layers including a transparent base layer and a release layer. The release layer is formed with a break line extending in a longitudinal direction of the tape, the break line being one of a liner series of holes and a liner series of slits.

According to another aspect, the disclosure also provides a method of creating a label with the above tape cassette and a label-creating device. The method includes: mounting the above tape cassette on the label-creating device; transferring the ink of the ink ribbon to the one of the tape and the cover film to form an image thereon; and bonding the tape and the cover film together to create the label having the image formed therein.

According to still another aspect, the disclosure also provides a method of attaching the label created by the above method to an object having a generally circular cross-section. The label has a first end portion and a second end portion opposite each other in a longitudinal direction thereof, the first end portion being closer to the image than the second end portion is to the image in the longitudinal direction. The method includes: peeling the release layer off the label; wrapping the first end portion around the object; and continuously wrapping the second end portion around the object to overlap with the first end portion in a radial direction of the object.

According to still another aspect, the disclosure provides a tape cassette including a tape, and a cover film. The tape is configured of a plurality of laminated layers including a transparent base layer and a release layer. The cover film is configured of a plurality of laminated layers including a heat-sensitive layer and a transparent film, the heat-sensitive layer being to be bonded to the tape.

According to still another aspect, the disclosure provides a method of creating a label with the above tape cassette and a label-creating device. The method includes: mounting the above tape cassette on the label-creating device; applying heat to the heat-sensitive layer for development of color to form an image in the heat-sensitive layer; and bonding the tape and the cover film together to create the label having the image formed therein.

According to still another aspect, the disclosure also provides a method of attaching the label created by the above method to an object having a generally circular cross-section. The label has a first end portion and a second end portion opposite each other in a longitudinal direction thereof, the first end portion being closer to the image than the second end portion is to the image in the longitudinal direction. The method includes: peeling the release layer off the label; wrapping the first end portion around the object; and continuously wrapping the second end portion around the object to overlap with the first end portion in a radial direction of the object.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

Hereinafter, one embodiment of the present disclosure will be described with reference to FIGS. 1 through 6.

<Label Creating Device>

First, a functional configuration of a label-creating device 1 according to the embodiment will be described with reference to FIG. 1. The label-creating device 1 can create printed labels using a tape cartridge 10 according to the embodiment.

Figure 1:
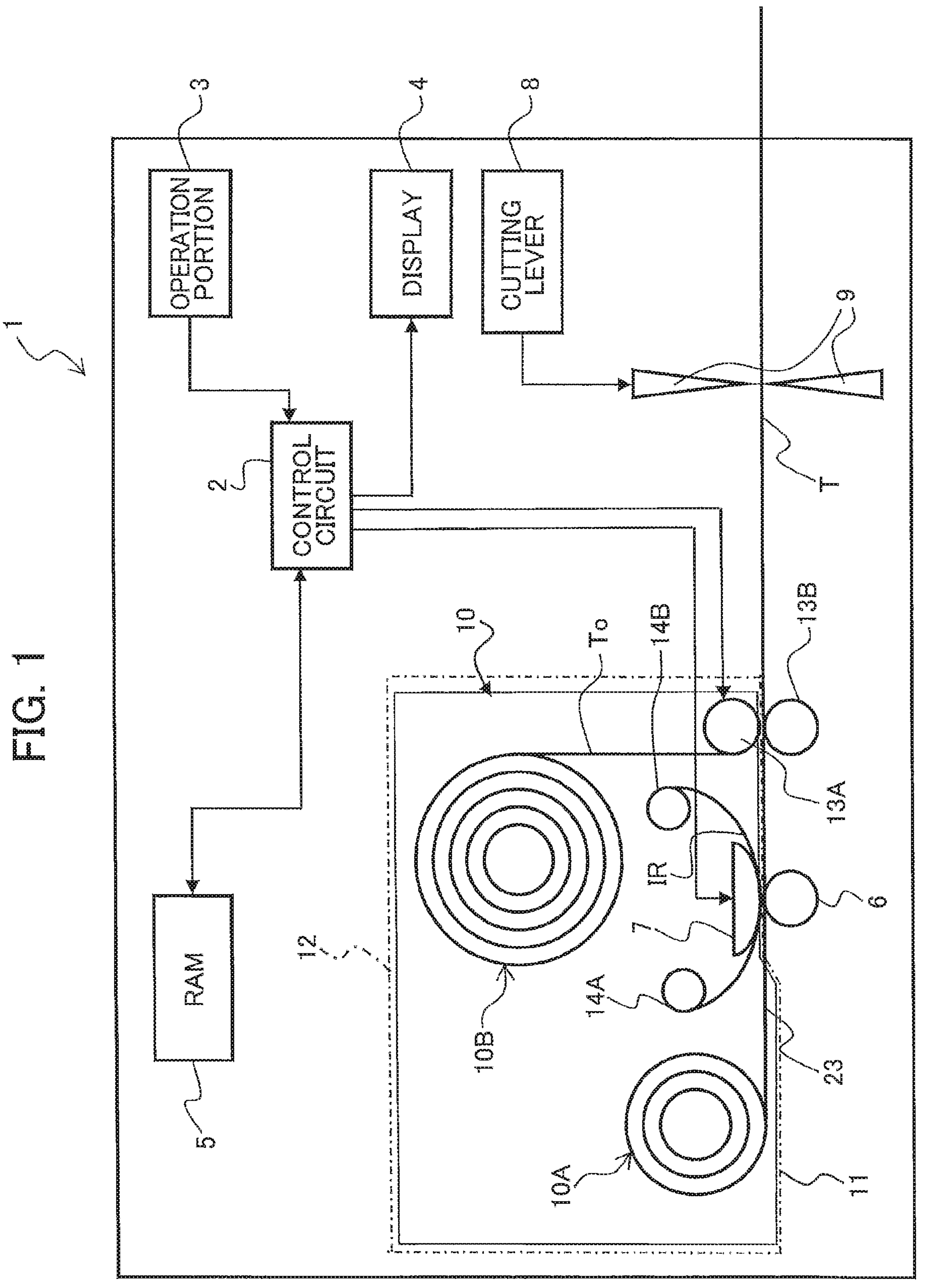
FIG. 1 is a schematic diagram illustrating an overall configuration of a label-creating device apparatus according to one embodiment.

As shown in FIG. 1, the label-creating device 1 has a control circuit 2, an operation portion 3 on which a user (operator) can perform desired operations, a display 4 for displaying various types of information, a RAM 5 for storing various types of information, a conveying roller 6, a print head 7, a cutting lever 8, and a cutter 9.

A cartridge holder 12 is also provided in the label-creating device 1. The tape cartridge 10 is detachably mounted in the cartridge holder 12. The tape cartridge 10 includes a housing 11, and tape rolls 10A and 10B accommodated in the housing 11. Note that the tape rolls 10A and 10B are depicted as concentric circles in the drawing for simplification but are actually tapes wound into rolls. The tape roll 10A is a roll of a cover film 23, while the tape roll 10B is a roll of a tape To. The tape To includes a plurality of layers. The layered structures of the cover film 23 and tape To will be described later in greater detail.

The control circuit 2 includes a CPU and a ROM not shown in the drawings. The control circuit 2 is configured to execute various programs pre-stored in the ROM while utilizing a temporary storage function of the RAM 5 in order to perform overall control of the label-creating device 1.

The conveying roller 6 is disposed in opposition to the print head 7. The cover film 23 paid out from the tape roll OA is transparent and is interposed between the conveying roller 6 and print head 7. Note that "transparent" in this specification is a concept that represents a property of transparency of a degree that allows humans to distinguish printed contents and includes the meaning "translucency" and the like.

The tape cartridge 10 also includes an ink ribbon supply roll 14A, and an ink ribbon take-up roll 14B. An ink ribbon IR is wound around the ink ribbon supply roll 14A. The ink ribbon IR paid out from the ink ribbon supply roll 14A is taken up by the ink ribbon take-up roll 14B. The print head 7 is configured to print by transferring ink from the ink ribbon IR onto the cover film 23 as the cover film 23 is conveyed by the conveying roller 6.

In the configuration described above, first the tape cartridge 10 is mounted in the cartridge holder 12. Subsequently, the print head 7 forms (hereinafter called "prints" for convenience) desired print objects specified by the user, such as characters and icons (referred to as a printed image R) on the cover film 23 drawn off the tape roll 10A by the rotation of the conveying roller 6. After the print objects have been formed on the cover film 23, the cover film 23 is interposed between pressure rollers 13A and 13B together with the tape To paid out from the tape roll 10B. The pressure rollers 13A and 13B compress the cover film 23 with the tape To to form a printed tape T. Subsequently, the user operates the cutting lever 8 to cut the printed tape T with the cutter 9, producing a printed label L.

<Detailed Description of the Tapes>

FIGS. 2A through 2D show detailed configurations of the tape To and the printed tape T described above. The tape To and printed tape T shown in FIGS. 2A through 2D are configured of an opaque release layer 24, a transparent bonding adhesive layer 22, and a transparent base layer 21 arranged in this order in a thickness direction of the tapes from one side (the bottom side in FIGS. 2C and 2D); hereinafter referred to as the "bottom side") toward the other side (the top side in FIGS. 2C and 2D; hereinafter referred to as the "top side"). Constituents of these layers 24, 22, and 23 include paper or colored film or fabric or metal. In this specification, "opaque" represents a property that prevents humans from recognizing printed contents and is a concept that does not include the meaning of "translucent" or the like.

Figure 2A:
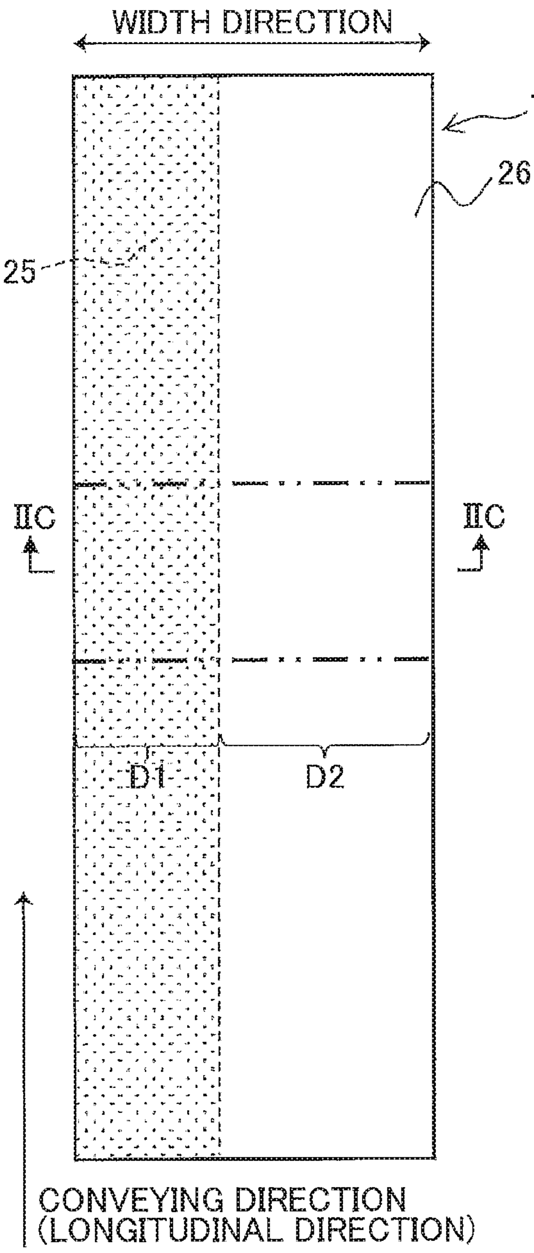
FIG. 2A is a plan view of a tape according to the embodiment prior to printing.
Figure 2B:
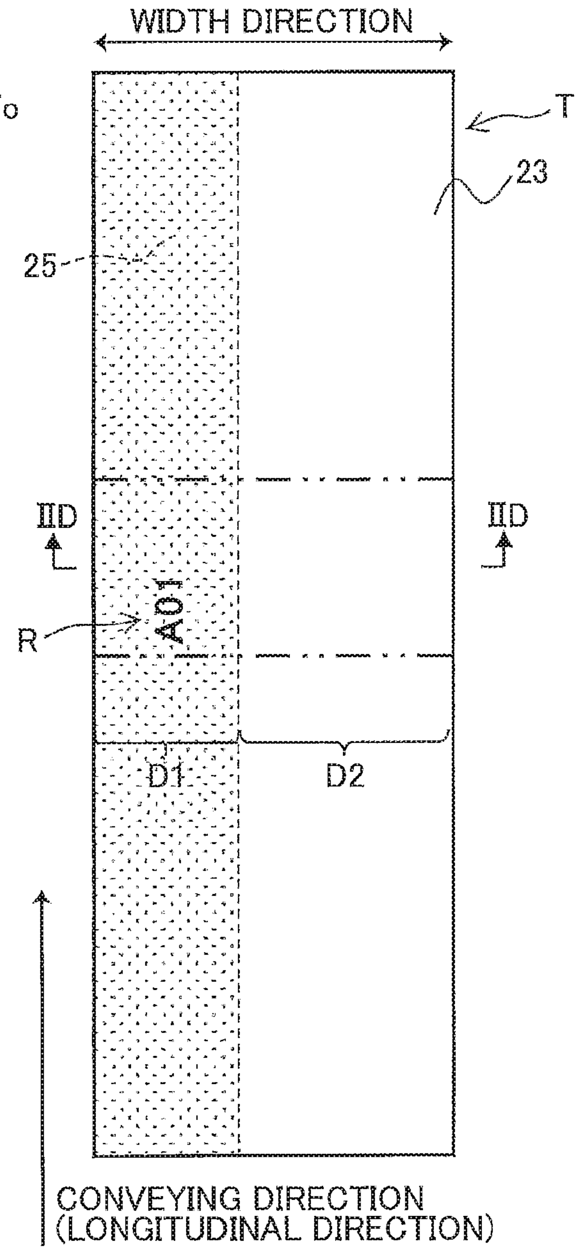
FIG. 2B is a plan view of a printed tape according to the embodiment.
Figure 2C:
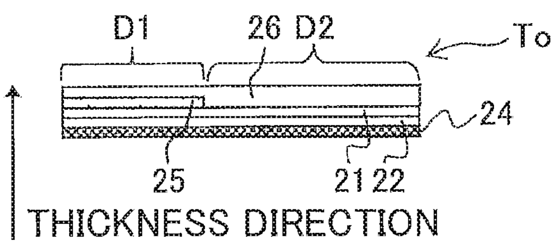
FIG. 2C is a lateral cross-sectional view of the tape according to the embodiment taken along a line IIC-IIC shown in FIG. 2A.
Figure 2D:
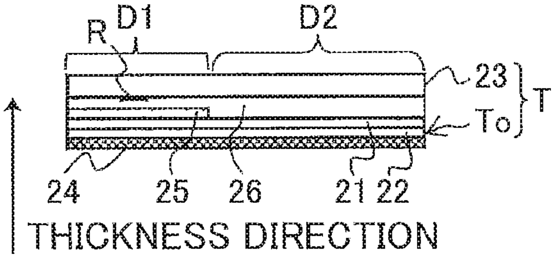
FIG. 2D is a lateral cross-sectional view of the printed tape according to the embodiment taken along a line IID-IID shown in FIG. 2B.

The release layer 24 is bonded to a bottom-side surface of the base layer 21 with respect to the thickness direction through the bonding adhesive layer 22. Further, a print background layer 25 is partially provided on a top-side surface of the base layer 21 with respect to the thickness direction (i.e., across a portion of the tape To in a width direction of the same, as illustrated in FIGS. 2C and 2D). The print background layer 25 is formed with a suitably non-transparent color. A top-side surface of the print background layer 25 in the thickness direction and the top-side surface of the base layer 21 on which the print background layer 25 is not provided are covered with a transparent bonding adhesive layer 26.

As a result of the above laminated structure, the tape To has a printing region D1 configured of five layers (the bonding adhesive layer 26, print background layer 25, base layer 21, bonding adhesive layer 22, and release layer 24), and a non-printing region D2 configured of four layers (the bonding adhesive layer 26, base layer 21, bonding adhesive layer 22, and release layer 24). In this example, the print head 7 forms printed objects (i.e., the printed image R) on the cover film 23, as described above. The printed objects include the text "A01", "A02", "A03", . . . . The label-creating device 1 then generates the printed tape T by bonding this printed cover film 23 to the tape To. Note that only the text "A01" is shown in FIG. 2B to avoid complicating the diagram. This also applies to the other drawings.

Figures 3A, 3B:
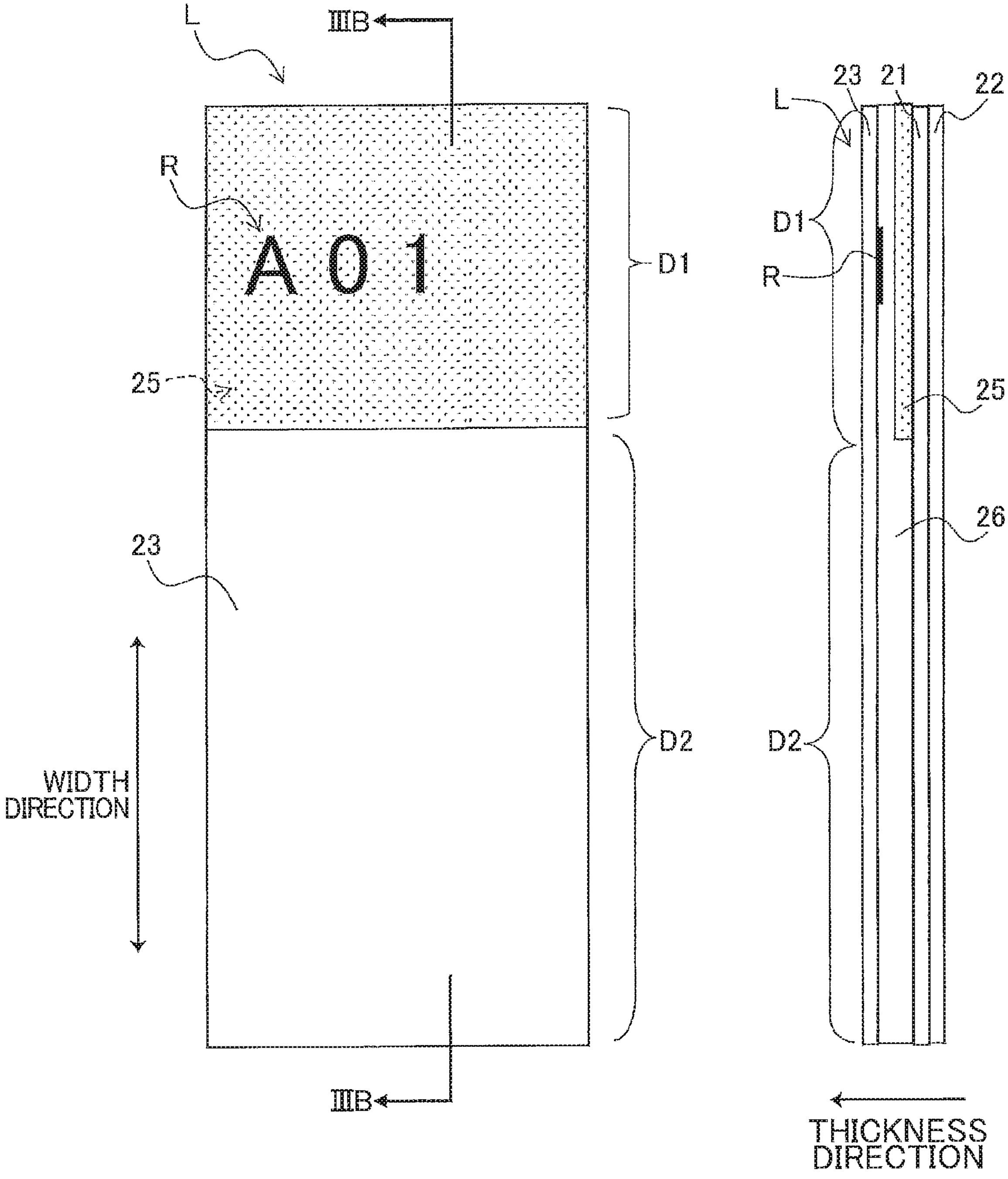
FIG. 3A is a plan view of a printed label according to the embodiment.
FIG. 3B is a longitudinal cross-sectional view of the printed label according to the embodiment taken along a line IIIB-IIIB shown in FIG. 3A.

The print background layer 25 in the tape To is arranged at a position corresponding to the printed image R in the cover film 23. Thereafter, the cutter 9 cuts the printed tape T with respect to the width direction at a desired position in a longitudinal direction of the tape T (see two-dot chain lines in FIG. 2B), thereby creating the printed label L. As shown in FIGS. 3A and 3B, the printed label L presents the text "A01" printed in the transparent cover film 23 with the color of the print background layer 25 beneath the laminating film 23 serving as the background color.

<Detailed Description of the Printed Label>

FIGS. 3A and 3B show the printed label L when the release layer 24 has been peeled off the bonding adhesive layer 22 in order to fix the printed label L to an object 302 (described later). Thus, at this time the printed label L has the printing region D1 configured of five layers that include the cover film 23, bonding adhesive layer 26, print background layer 25, base layer 21, and bonding adhesive layer 22; and the non-printing region D2 configured of four layers that include the cover film 23, bonding adhesive layer 26, base layer 21, and bonding adhesive layer 22.

<Procedure for Attaching a Printed Label to an Object>

The procedure for attaching the printed label L created according to the process described above to the object 302 having a generally circular cross section will be described with reference to FIGS. 4A through 5C.

Figure 4A:
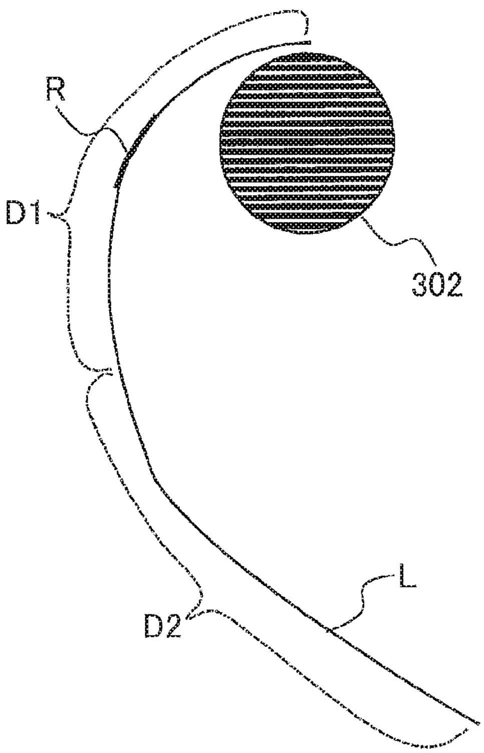
FIGS. 4A through 4C are views schematically illustrating how the printed label according to the embodiment is wrapped around an object having a relatively small diameter.
Figure 4B:
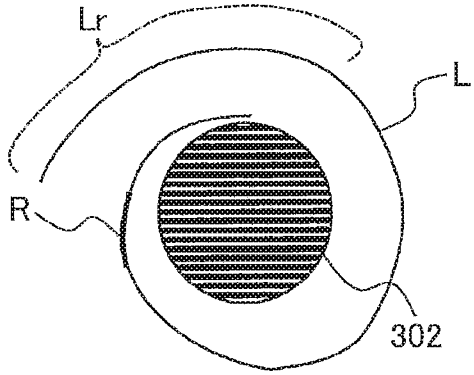
Figure 4C:
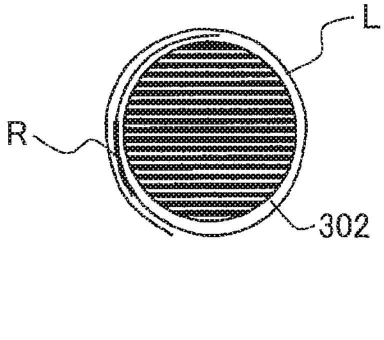

FIGS. 4A through 4C show an example in which the object 302 has a relatively small diameter. As described above, the print background layer 25 is provided only partially with respect to the width direction of the printed label L. Therefore, when wrapping the printed label L around the object 302, first the side of the printed label L having the print background layer 25 (the top side in FIGS. 3A and 3B) is affixed to the object 302, as shown in FIG. 4A. Subsequently, a remainder of the printed label L on the side not having the print background layer 25 (the bottom side in FIGS. 3A and 3B) is wrapped around the object 302, as illustrated in FIG. 4B. After the printed label L has been wrapped about once around the circumference of the object 302 in this way, a remaining portion Lr that has not yet been wrapped around the object 302 remains relatively long when the object 302 has a small diameter, as illustrated in FIG. 4B. Since the remaining portion Lr does not include the print background layer 25 and because the bonding adhesive layer 22, base layer 21, bonding adhesive layer 26, and cover film 23 included in the remaining portion Lr are all transparent, the remaining portion Lr is visually transparent as a whole. Thus, even though the remaining portion Lr continuously wrapped around the object 302 overlaps and covers the print background layer 25 and a display portion with the printed image R positioned radially outward of the print background layer 25, the remaining portion Lr can be affixed to the object 302 such that the display portion is visually recognizable from the outside. At this time, the remaining portion Lr covering the display portion, such as the text as described above, can protect this display portion from becoming dirty or peeling due to rubbing.

Figure 5A:
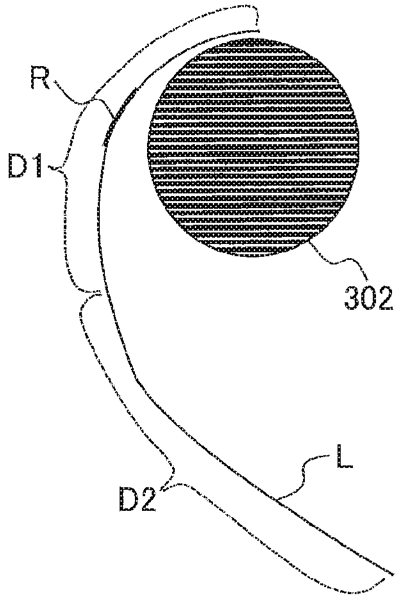
FIGS. 5A through 5C are views schematically illustrating how the printed label according to the embodiment is wrapped around an object having a relatively large diameter.
Figure 5B:
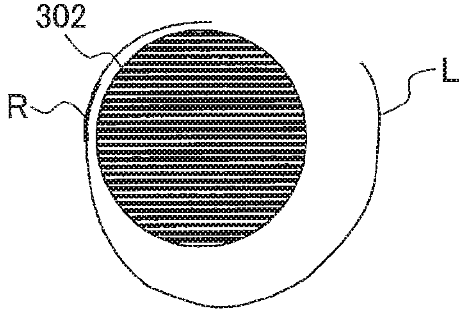
Figure 5C:
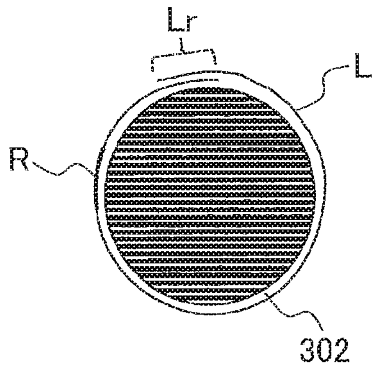

FIGS. 5A through 5C shown an example in which the object 302 has a relatively large diameter. In this case, when the printed label L is wrapped about once around the circumference of the object 302, the remaining portion Lr that has not yet been wrapped around the object 302 is relatively short, as illustrated in FIG. 5B. Consequently, even through the remaining portion Lr is continuously wrapped around the object 302, the remaining portion Lr may be unable to cover the display portion including the printed image R (see FIG. 5C). However, when the printed label L is created as described above, the tape To including the base layer 21, print background layer 25, and release layer 24 is bonded to the cover film 23. Accordingly, the area of the laminating cover film 23 to which ink from the ink ribbon IR was transferred, i.e., the printed image R in the region corresponding to the print background layer 25, is present between the cover film 23 and the tape To, which were bonded together as described above (see FIGS. 2D and 3B). Thus, despite not being able to cover the display portion with the remaining portion Lr as described above, the display portion is still protected from dirt and peeling caused by rubbing.

<Sample Application for the Printed Label>

Figure 6:
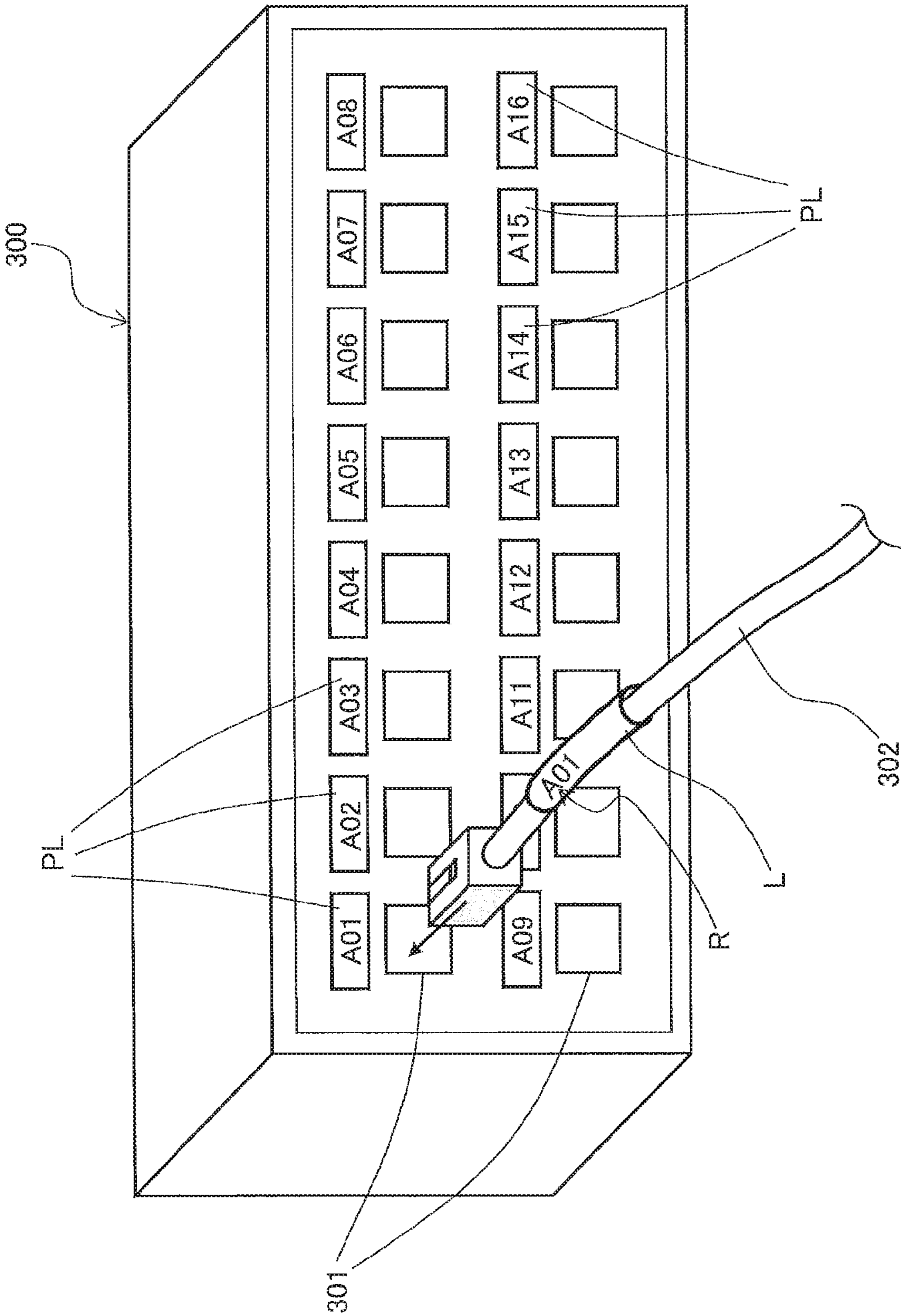
FIG. 6 is a perspective view illustrating a sample application of the printed label according to the embodiment.

FIG. 6 shows a sample use of the printed label L according to the embodiment. In this example, a cable connected to a switching hub 300 for relaying information over a network, such as a wired LAN, is applied as the object 302. The switching hub 300 in FIG. 6 has eight slots 301 in each of a top row and a bottom row, for a total of sixteen slots 301. A plate PL is provided over each of the slots 301 for indicating an ID name of the corresponding slot 301. In the example of FIG. 6, plates PL indicating the ID names "A01" through "A08" are provided over the top eight slots 301 in sequence from left to right. Similarly, plates PL indicating the ID names "A09" through "A16" are provided over the bottom eight slots 301 in sequence from left to right.

The objects 302 (cables) must be appropriately connected to the corresponding slots 301. To facilitate connections, a printed image R having the same content as the ID name of the slot 301 to which the corresponding object 302 is to be connected is formed on the printed label L. The printed label L is then affixed to one end of the object 302 to be inserted into the corresponding slot 301. In other words, a printed label L printed with the same text as the ID name on the plate PL of the slot 301 to which the object 302 is to be connected is attached to the object 302. This labeling clarifies the correlations between the slots 301 and objects 302 (cables) to be connected to the slots 301, thereby preventing incorrect wiring.

Technical Advantages of the Embodiment

In the embodiment described above, the remaining portion Lr of the printed label L can cover the display portion of the printed image R when wrapped around the object 302 if the object 302 has a relatively small diameter, thereby protecting the display portion from becoming dirty or peeling due to rubbing. By making the entire remaining portion Lr transparent, the display portion is visually recognizable through the remaining portion Lr at this time.

Further, the printed label L is configured such that the cover film 23 covers the printed image R. Hence, the printed label L can still protect the display portion of the printed image R from becoming dirty or peeling due to rubbing even when the object 302 has a relatively large diameter that prevents the remaining portion Lr from covering the display portion. Thus, the display portion of the printed image R to which ink has been transferred can be reliably protected regardless of whether the diameter of the object 302 is relatively small or relatively large, thereby greatly expanding the range of diameters for the objects 302 that are suitable as objects to which the printed labels L can be affixed.

Modifications and Variations of the Embodiment

While the invention has been described in detail with reference to a specific embodiment thereof, it would be apparent to those skilled in the art that many modifications and variations may be made therein without departing from the scope of the disclosure which is defined by the attached claims.

Hereinafter, sample modifications to the embodiment will be described. In the following modifications, like parts and components to those in the depicted embodiment are designated with the same reference numerals and descriptions of these parts and components will be omitted or simplified where appropriate.

(1) Providing a Transparent Ink Layer Adjacent to the Background Layer

Figure 7A:
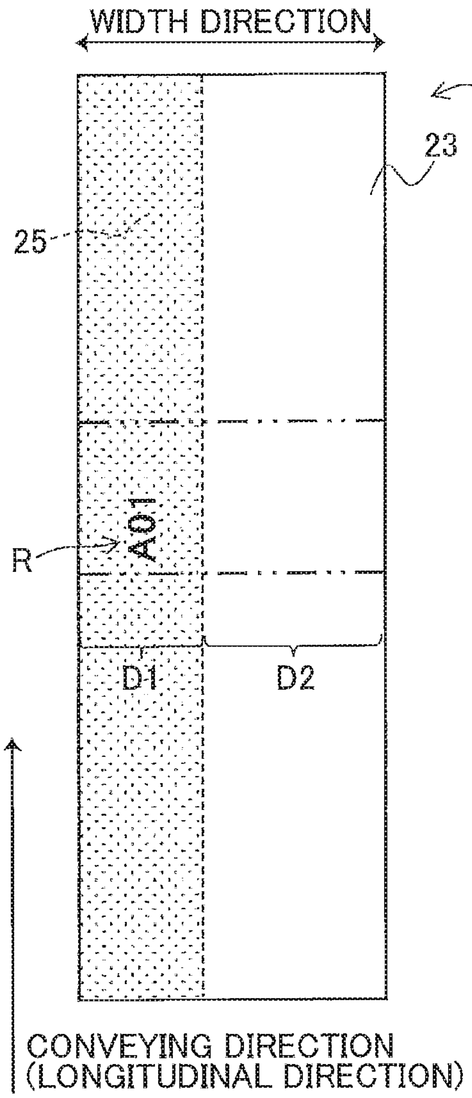
FIG. 7A is a plan view of a printed tape according to a first modification to the embodiment.
Figure 7C:
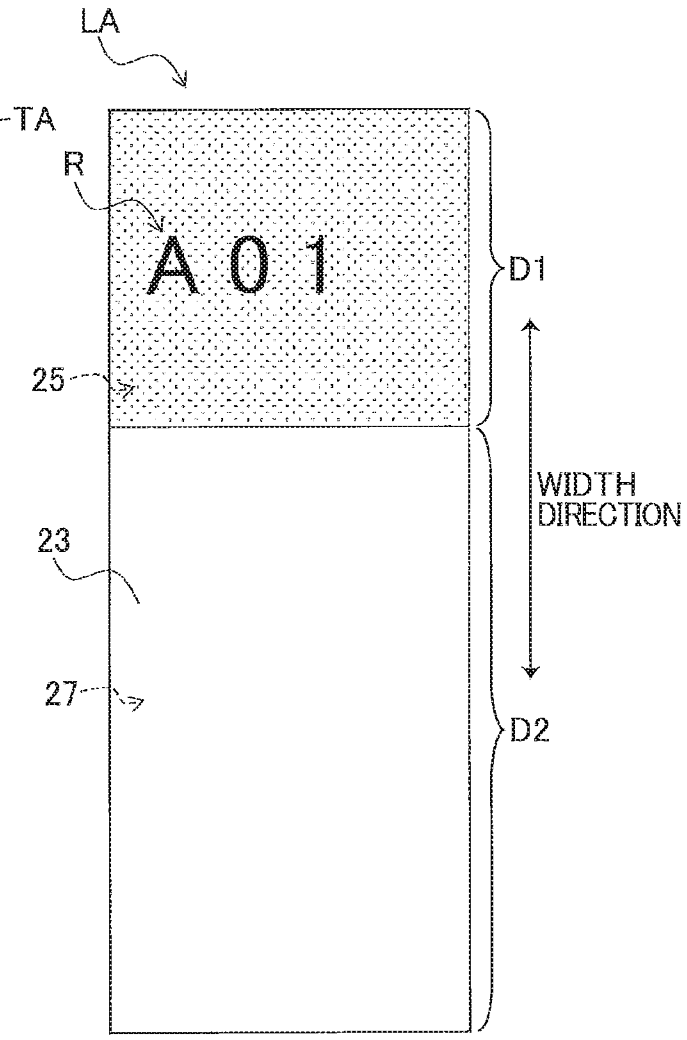
FIG. 7C is a plan view of a printed label according to the first modification.
Figure 7B:
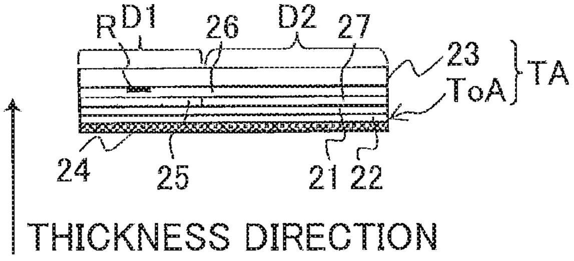
FIG. 7B is a lateral cross-sectional view of the printed tape according to the first modification.

FIGS. 7A, 7B, and 7C illustrate a tape ToA, a printed tape TA and a printed label LA according to a first modification to the embodiment. FIGS. 7A, 7B, and 7C correspond to FIGS. 2B, 2D, and 3A of the embodiment, respectively.

As shown in FIGS. 7A through 7C, in the printed tape TA of the first modification, the print background layer 25 is arranged along one widthwise edge (the left edge in FIGS. 7A and 7B) of the tape ToA, as in the depicted embodiment. In order to eliminate a step caused by the presence of the print background layer 25 in the tape ToA, a transparent ink layer 27 is formed according to a well-known technique called gravure printing, for example. The transparent ink layer 27 is formed adjacent to the print background layer 25 along the other edge of the tape ToA in the width direction of the tape ToA (the right edge in FIGS. 7A and 7B).

With this structure of the first modification, the same technical advantages as the depicted embodiment can be obtained. In addition, by providing the transparent ink layer 27 in juxtaposition with the print background layer 25 in the width direction, the structure of the first modification can avoid the step that could be present in a laminated structure without the transparent ink layer 27.

(2) Providing the Background Layer in an Intermediate Region

Figure 8A:
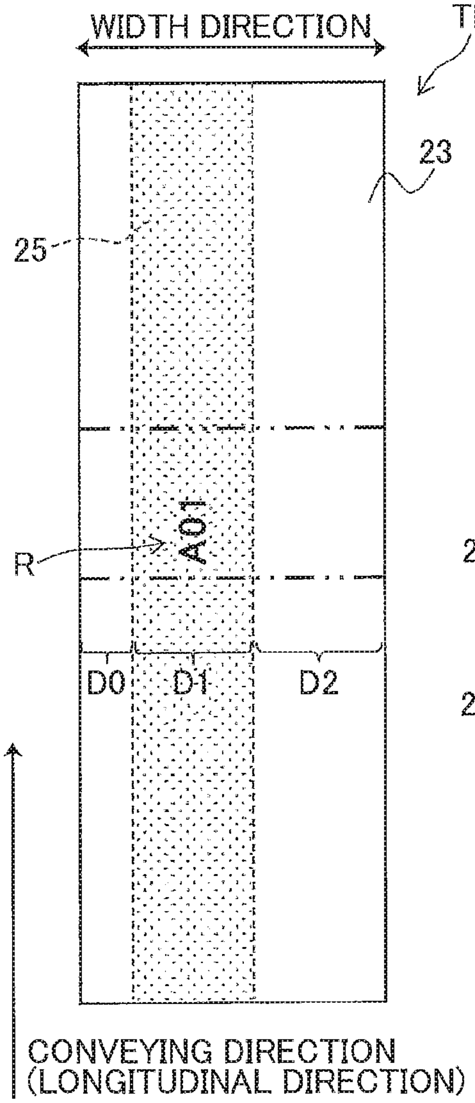
FIG. 8A is a plan view of a printed tape according to a second modification to the embodiment.
Figure 8C:
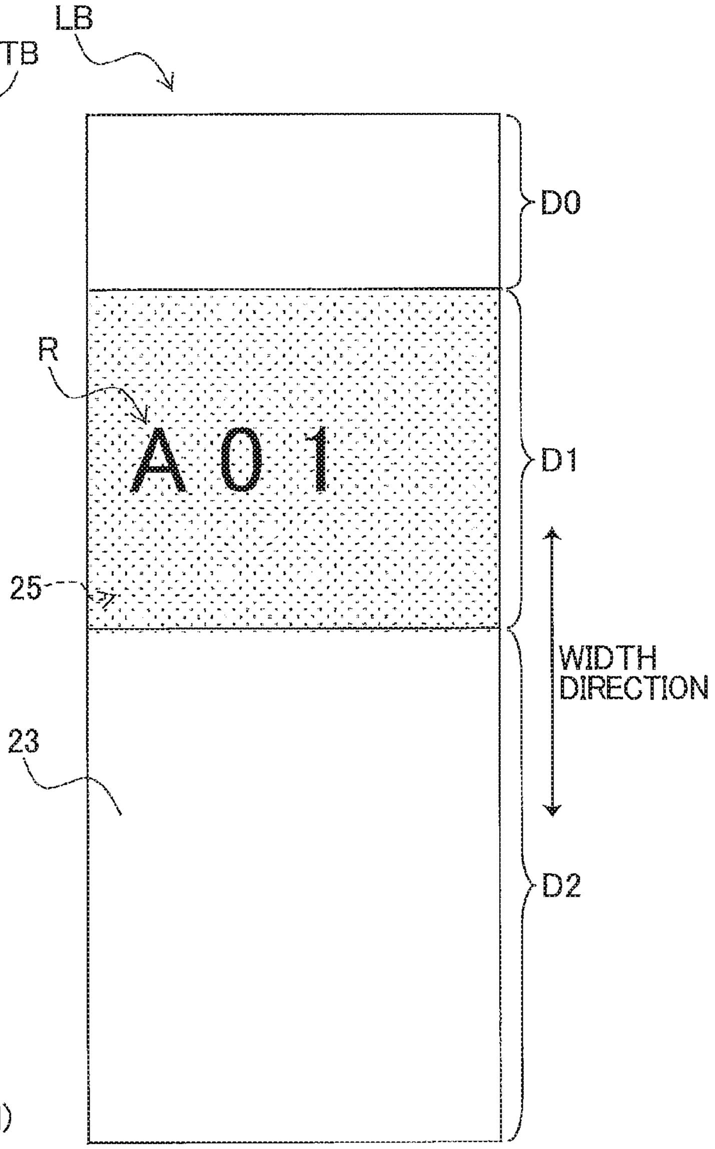
FIG. 8C is a plan view of a printed label according to the second modification.
Figure 8B:
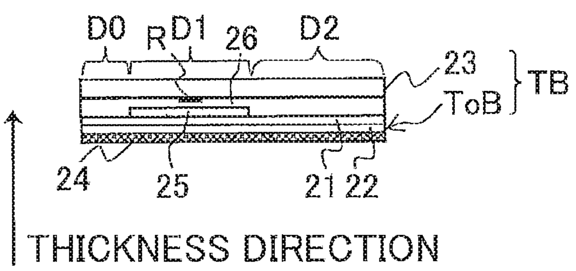
FIG. 8B is a lateral cross-sectional view of the printed tape according to the second modification.

FIGS. 8A, 8B, and 8C illustrate a tape ToB, a printed tape TB and a printed label LB according to a second modification to the embodiment. FIGS. 8A, 8B, and 8C correspond to FIGS. 2B, 2D, and 3A of the embodiment, respectively.

As shown in FIGS. 8A through 8C, the print background layer 25 is provided in an intermediate region of the tape ToB with respect to a width direction thereof in the second modification. This intermediate region does not include either widthwise edge of the tape ToB (i.e., neither the left edge nor the right edge in FIGS. 8A and 8B).

Consequently, the tape ToB has a non-printing region D0 that includes one widthwise edge of the tape ToB (the left edge in FIGS. 8A and 8B) and that is configured of four layers (the bonding adhesive layer 26, base layer 21, bonding adhesive layer 22, and release layer 24); the non-printing region D2 that includes the other widthwise edge of the tape ToB (the right edge in FIGS. 8A and 8B) and that is configured of four layers (the bonding adhesive layer 26, base layer 21, bonding adhesive layer 22, and release layer 24); and the printing region D1 that is positioned in the intermediate region between the non-printing regions D0 and D2 in the width direction, the intermediate region including no widthwise edges of the tape ToB (i.e., neither the left edge nor the right edge in FIGS. 8A and 8B) and being configured of five layers (the bonding adhesive layer 26, print background layer 25, base layer 21, bonding adhesive layer 22, and release layer 24). The printed image R is formed on the cover film 23 in a position corresponding to the print background layer 25; that is, in a position within the printing region D1 of the printed tape TB.

Thus, the printed label LB of the second modification shown in FIG. 8C has: the printing region D1 configured of five layers including the cover film 23, bonding adhesive layer 26, print background layer 25, base layer 21, and bonding adhesive layer 22; and the non-printing regions D0 and D2 each configured of four layers including the cover film 23, bonding adhesive layer 26, base layer 21, and bonding adhesive layer 22.

The structure of the second modification can obtain the same technical advantages as the depicted embodiment.

(3) Providing the Background Layer Beneath the Base Layer

Figure 9A:
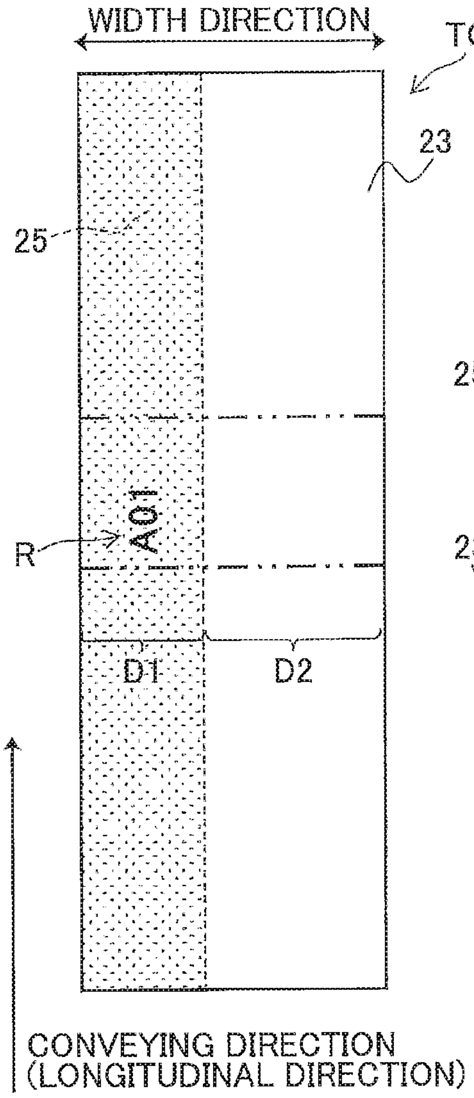
FIG. 9A is a plan view of a printed tape according to a third modification to the embodiment.
Figure 9C:
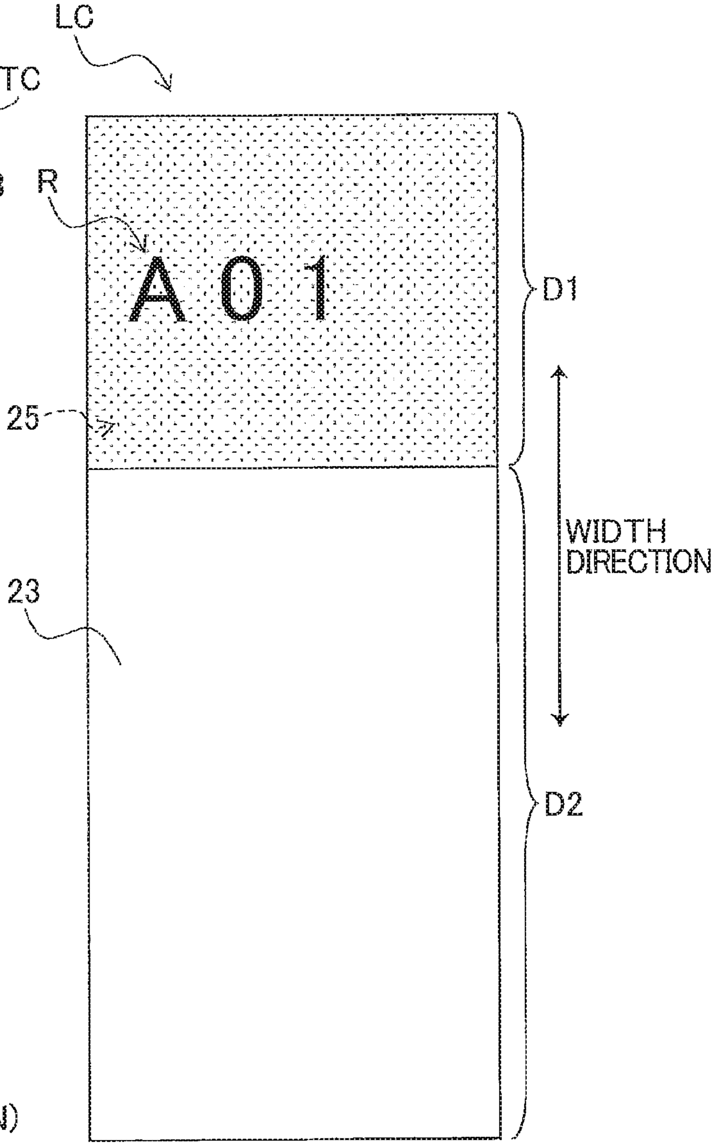
FIG. 9C is a plan view of a printed label according to the third modification.
Figure 9B:
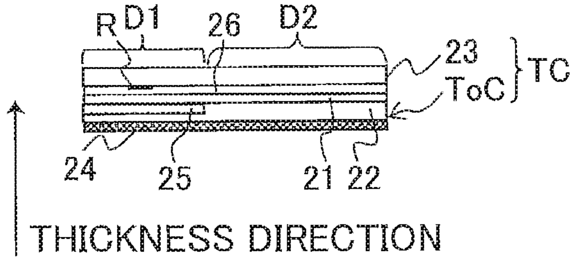
FIG. 9B is a lateral cross-sectional view of the printed tape according to the third modification.

FIGS. 9A, 9B, and 9C illustrate a tape ToC, a printed tape TC and a printed label LC according to a third modification to the embodiment. FIGS. 9A, 9B, and 9C correspond to FIGS. 2B, 2D, and 3A of the embodiment, respectively.

The print background layer 25 in the tape ToC of the third modification is arranged on the release layer 24 side of the base layer 21 (i.e., on the bonding adhesive layer 22 side of the base layer 21). Consequently, as illustrated in FIGS. 9A through 9C, in the printed tape TC of the third modification, the printing region D1 is configured of six layers including the cover film 23, bonding adhesive layer 26, base layer 21, print background layer 25, bonding adhesive layer 22, and release layer 24; and the non-printing region D2 is configured of five layers including the cover film 23, bonding adhesive layer 26, base layer 21, bonding adhesive layer 22, and release layer 24.

The structure of the third modification can obtain the same technical advantages as the depicted embodiment.

Figure 10A:
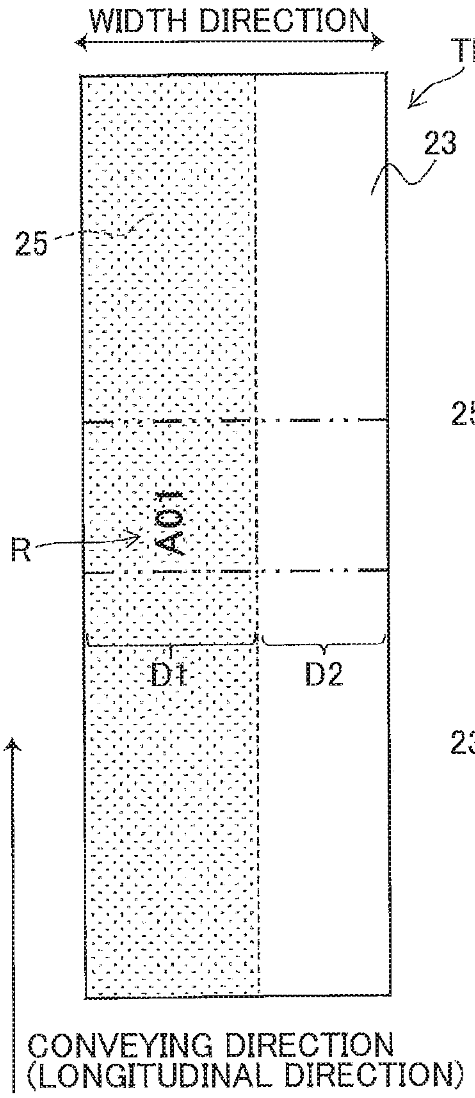
FIG. 10A is a plan view of a printed tape according to a fourth modification to the embodiment.
Figure 10C:
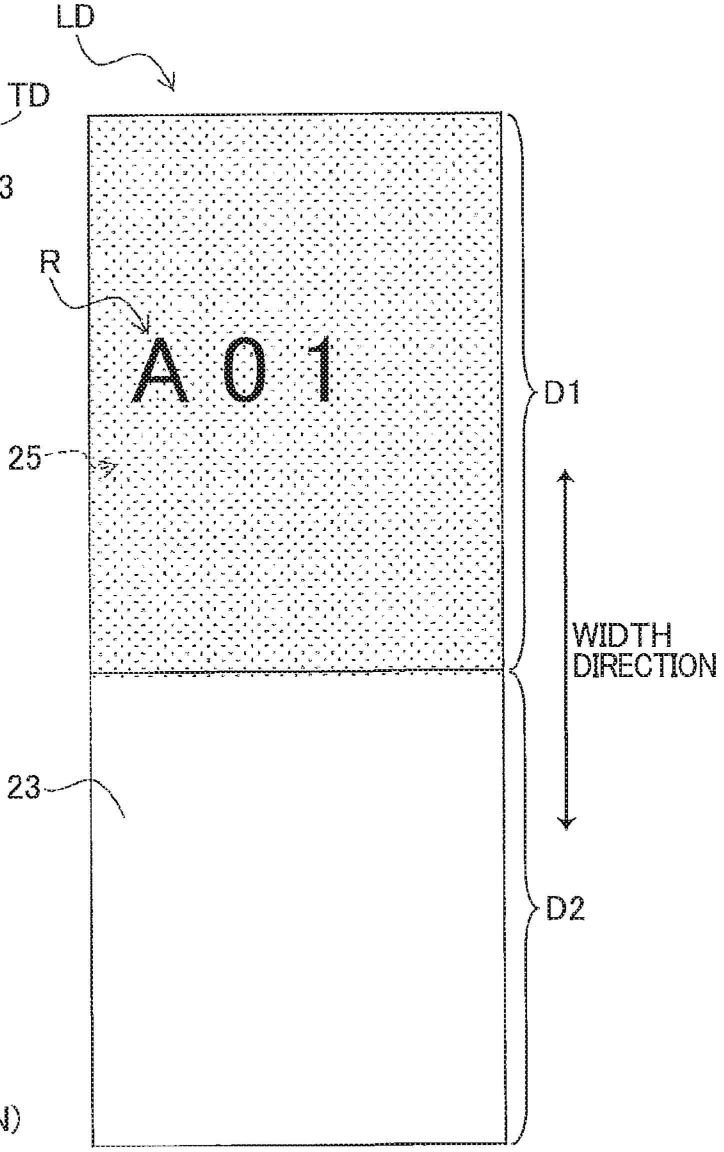
FIG. 10C is a plan view of a printed label according to the fourth modification.
Figure 10B:
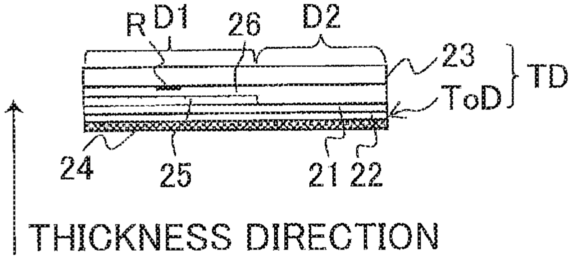
FIG. 10B is a lateral cross-sectional view of the printed tape according to the fourth modification.
Figure 11A:
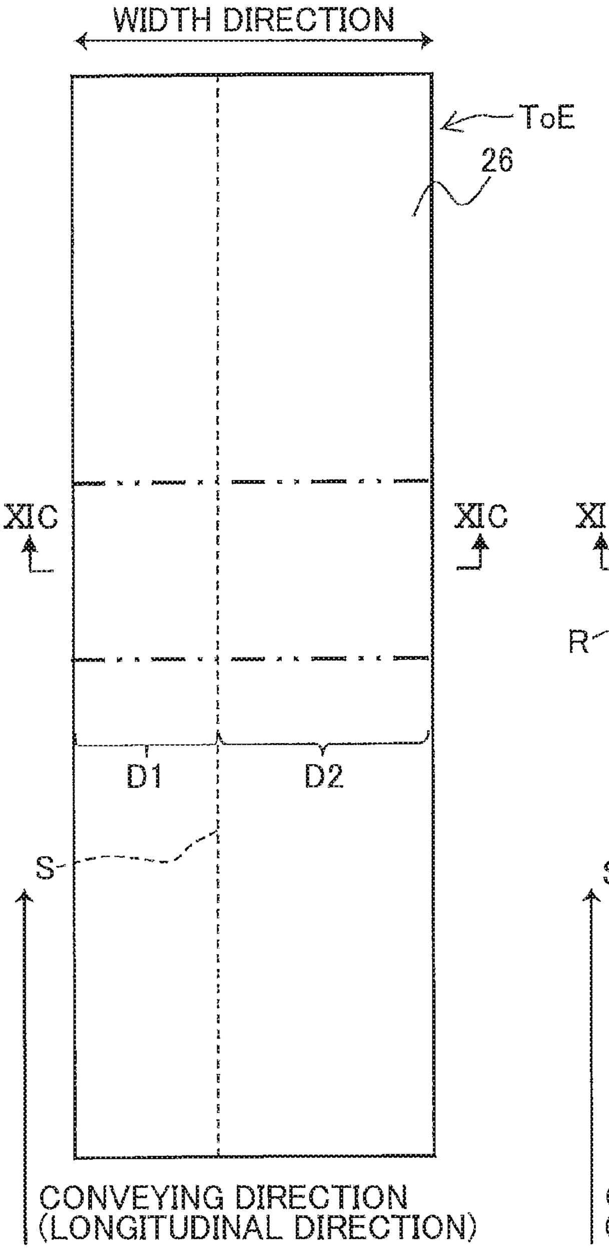
FIG. 11A is a plan view of a tape according to a fifth modification to the embodiment prior to printing.
Figure 11B:
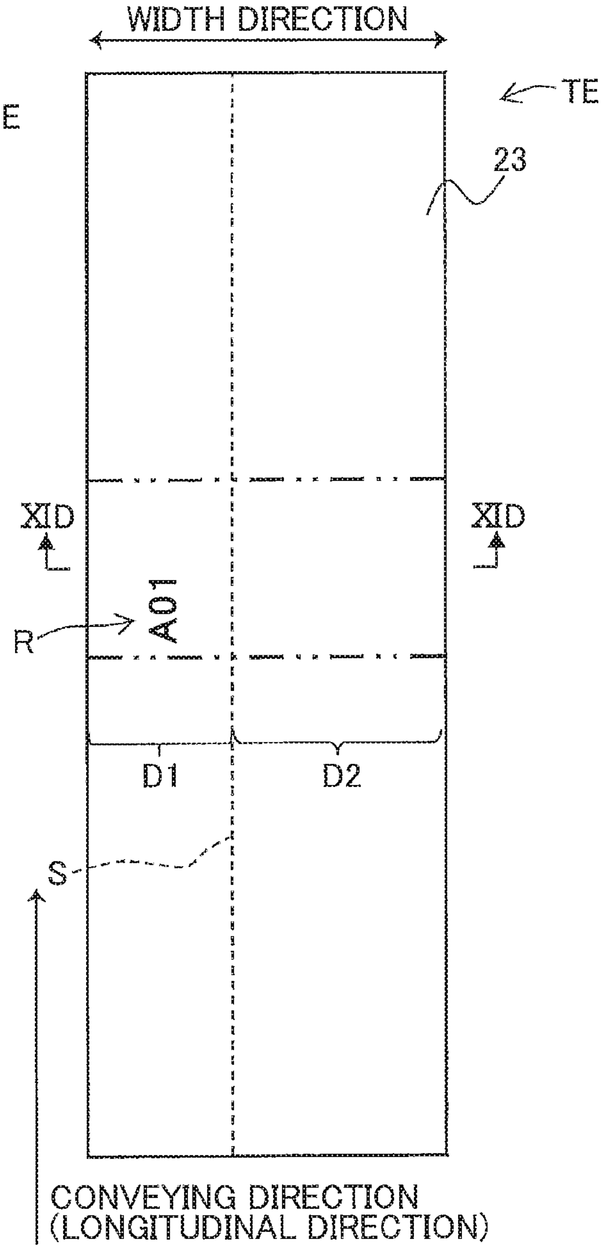
FIG. 11B is a plan view of a printed tape according to the fifth modification.
Figure 11C:
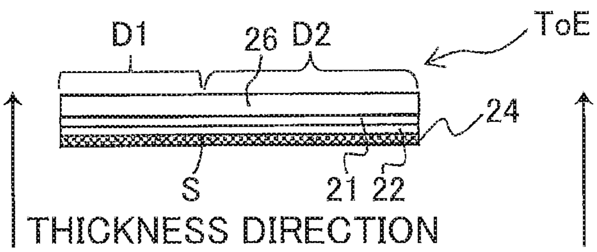
FIG. 11C is a lateral cross-sectional view of the tape according to the fifth modification taken along a line XIC-XIC shown in FIG. 11A.
Figure 11D:
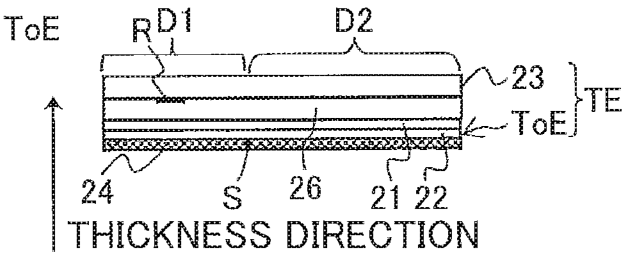
FIG. 11D is a lateral cross-sectional view of the printed tape according to the fifth modification taken along a line XID-XID shown in FIG. 11B.

(4) Providing a Background Layer Having a Width One-Half the Tape Width or Greater FIGS. 10A, 10B, and 10C illustrate a tape ToD, a printed tape TD and a printed label LD according to a fourth modification to the embodiment. FIGS. 10A, 10B, and IOC correspond to FIGS. 2B, 2D, and 3A of the embodiment, respectively.

In this modification, the print background layer 25 has a dimension in the width direction that is larger than that in the structures of the tape To and printed tape T of the embodiment shown in FIGS. 2A through 2D. In other words, one widthwise edge of the print background layer 25 (the left edge in FIGS. 10A and 10B) is aligned with the edge of the tape ToD and the printed tape TD, while the other widthwise edge of the print background layer 25 (the right edge in FIGS. 10A and 10B) is separated from the first edge by a distance exceeding one-half the tape width. In other words, the widthwise dimension of the print background layer 25 is at least one-half (greater than one-half in this example) the widthwise dimension of the base layer 21 provided in the tape ToD and printed tape TD.

The structure of the fourth modification can obtain the same technical advantages as the depicted embodiment.

(5) Leaving a Portion of the Release Layer as a Substitute for the Print Background Layer <Detailed Description of the Tape>

FIGS. 11A through 11D show detailed configurations of a tape ToE and a printed tape TE according to a fifth modification to the embodiment. FIGS. 11A through 11D correspond to FIGS. 2A through 2D of the embodiment.

The tape ToE and printed tape TE shown in FIGS. 11A through 11D are similar to the tape To and printed tape T of the embodiment, but is different in that the print background layer 25 is omitted. That is, the tape ToE is configured of the release layer 24, bonding adhesive layer 22, base layer 21, and bonding adhesive layer 26 layered in this order from one side in the thickness direction (the bottom side in FIGS. 11C and 11D) to the other side in the thickness direction (the top side in FIGS. 11C and 11D) for both the printing region D1 and non-printing region D2. Further, a break line S (a linear series of holes or slits such as a perforated line) extending in the longitudinal direction of the tape ToE is provided in the release layer 24 along a borderline of the printing region D1 and non-printing region D2. Note that the break line S may be slits or scored grooves forming thin parts in the thickness direction, a series of holes (including through-holes and depressions), or the like.

<Detailed Description of the Printed Label>

Figure 12A:
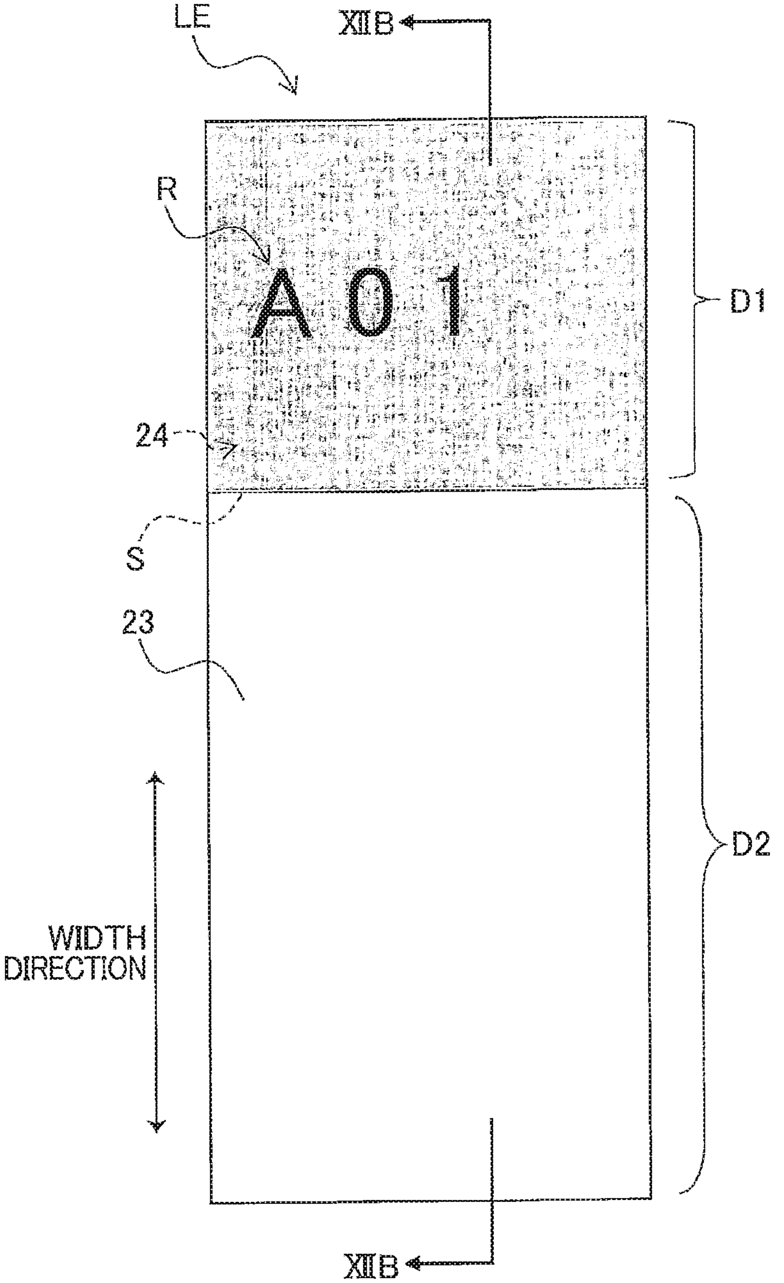
FIG. 12A is a plan view of a printed label according to the fifth modification.
Figure 12B:
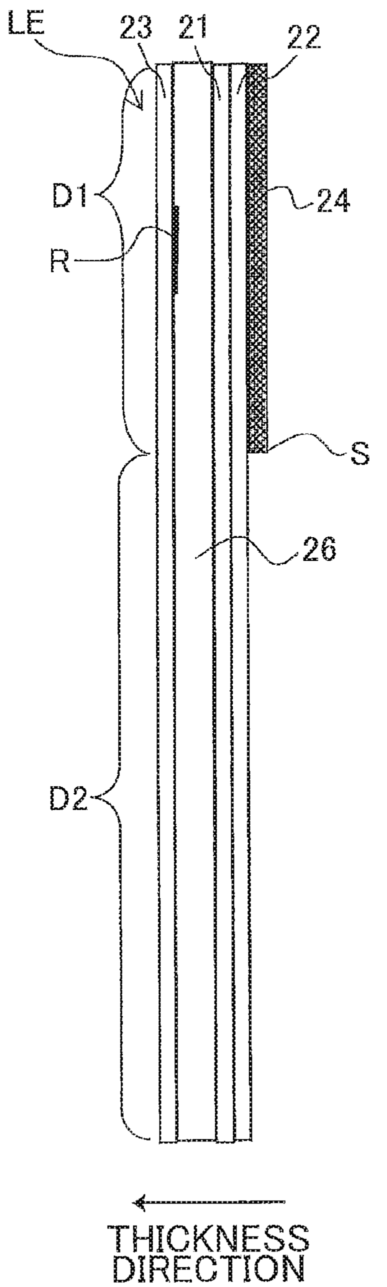
FIG. 12B is a longitudinal cross-sectional view of the printed label according to the fifth modification taken along a line XIIB-XIIB shown in FIG. 12A.

FIGS. 12A and 12B show a detailed configuration of a printed label LE formed by the tape ToE and the printed tape TE of the fifth modification. FIGS. 12A and 12B correspond to FIGS. 3A and 3B of the embodiment.

With the printed label LE according to the fifth modification, only the portion of the release layer 24 corresponding to the non-printing region D2 is peeled off the printed label LE by splitting the release layer 24 along the break line S before the printed label LE is affixed to the object 302, leaving the portion of the release layer 24 corresponding to the printing region D1 as illustrated in FIGS. 12A and 12B. As a result, as shown in FIG. 12B, the printing region D1 of the printed label LE according to the fifth modification is configured of five layers including the cover film 23, bonding adhesive layer 26, base layer 21, bonding adhesive layer 22, and release layer 24; and the non-printing region D2 is configured of four layers including the cover film 23, bonding adhesive layer 26, base layer 21, and bonding adhesive layer 22. In this way, the release layer 24 in the printing region D1 is used in place of the print background layer 25 of the depicted embodiment. As illustrated in FIG. 12A, the printed label LE presents the text "A01" printed on the transparent cover film 23 with the color of the release layer 24 beneath the laminating cover film 23 serving as the background color.

<Technical Advantages of the Fifth Modification>

As described above, the release layer 24 is provided with the break line S in the fifth modification. By splitting the release layer 24 at the break line S before affixing the printed label LE to the object 302, the portion of the release layer 24 on one side of the break line S in the width direction (i.e., the portion corresponding to the printing region D1) is not peeled off, but remains on the printed label LE. Hence, by printing text or the like in the portion of the cover film 23 corresponding to the printing region D1 that is bonded to the tape ToE, the label-creating device 1 can create a printed label LE presenting the printed text or the like while using the remaining portion of the release layer 24 as the background color, similar to the print background layer 25 described in the embodiment.

As in the depicted embodiment, the display portion having the printed image R in the fifth modification is present between the cover film 23 and tape ToE once the tape ToE and cover film 23 are bonded together to create the printed label LE. Thus, as in the embodiment, the printed label LE can protect the display portion (the printed image R) from dirt or peeling caused by rubbing even when the object 302 has a relatively large diameter.

Note that, while the print head 7 prints on the cover film 23 being bonded to the tape ToE in an area that corresponds to the printing region D1 in this modification, the print head 7 may instead print in an area corresponding to the printing region D1 in another desired layer of the tape ToE, such as the base layer 21 (see the sixth modification described below). In this case, as in the fifth modification, the label-creating device 1 can create a printed label LE by printing text or the like on the tape ToE side while using the remaining portion of the release layer 24 as the background color.

(6) Printing in the Print Background Layer of the Tape

<Label-Creating Device>

Figure 13:
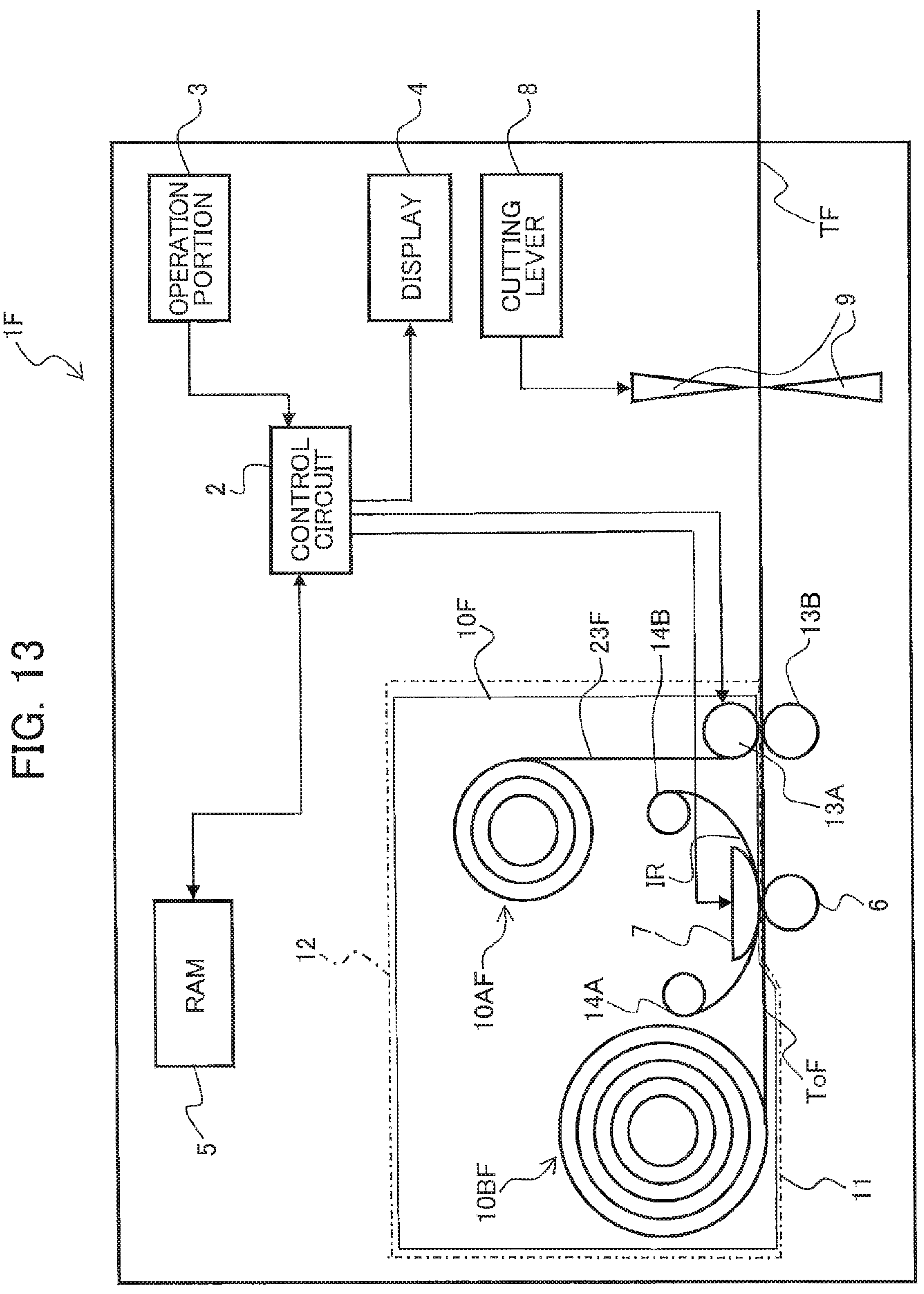
FIG. 13 is a schematic diagram illustrating an overall configuration of a label-creating device apparatus according to a sixth modification to the embodiment.

FIG. 13 shows a functional structure of a label-creating device 1F according to a sixth modification to the embodiment. FIG. 13 corresponds to FIG. 1 of the embodiment.

In the sixth modification of FIG. 13, a tape cartridge 10F is detachably mounted in the cartridge holder 12 in place of the tape cartridge 10 of the embodiment. The tape cartridge 10F holds tape rolls 10AF and 10BF in the housing 11. Note that the tape rolls 10AF and 10BF are depicted as concentric circles in the drawing for simplification, but are actually wound into rolls. A cover film 23F is wound around the tape roll 10AF, while a tape ToF (see FIG. 14 described later) is wound about the tape roll 10BF. The cover film 23F includes an adhesive layer 23*a*F (see FIGS. 14C and 14D described later). The tape ToF differs from the tape To of the embodiment in that the bonding adhesive layer 26 has been omitted.

The tape ToF paid out from the tape roll 10BF is interposed between the conveying roller 6 and print head 7. The print head 7 forms the desired printed image R by transferring ink from the ink ribbon IR paid out from the ink ribbon supply roll 14A to the print background layer 25 of the tape ToF conveyed by the conveying roller 6. After the printed image R has been formed in the print background layer 25 of the tape ToF, the tape ToF is compressed against the cover film 23F paid out from the tape roll OAF between the pressure rollers 13A and 13B, forming a printed tape TF. Subsequently, the printed tape TF is cut by the cutter 9 to produce a printed label LF.

<Detailed Description of the Tape>

Figure 14A:
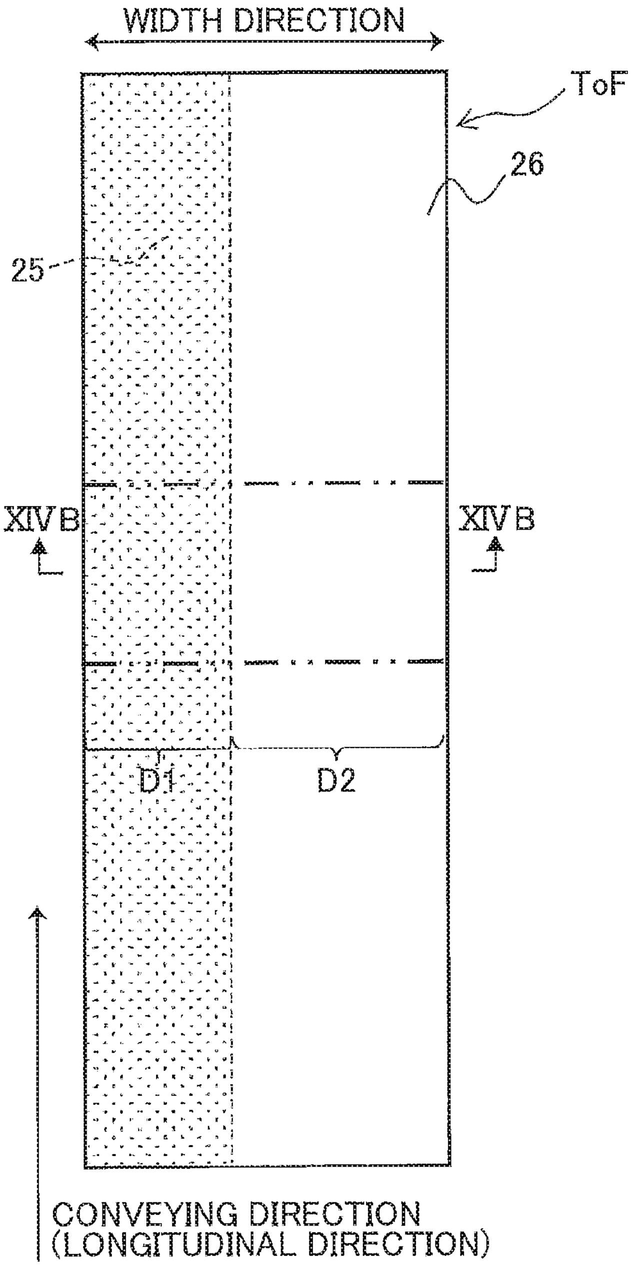
FIG. 14A is a plan view of a tape according to the sixth modification prior to printing.
Figure 14B:
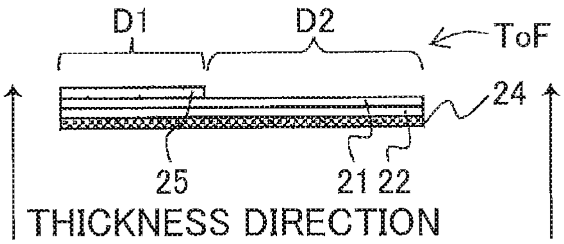
FIG. 14B is a lateral cross-sectional view of the tape according to the sixth modification taken along a line XIVB-XIVB shown in FIG. 14A.

FIGS. 14A and 14B show a detailed configuration of the tape ToF of the sixth modification. As shown in FIGS. 14A and 14B, the tape ToF according to the sixth modification is configured of the release layer 24, bonding adhesive layer 22, and base layer 21 arranged in this order from one side in the thickness direction (the bottom side in FIG. 14B) toward the other side in the thickness direction (the top side in FIG. 14B). As in the embodiment, the print background layer 25 is partially provided on the top-side surface of the base layer 21 with respect to the thickness direction.

As a result of the above laminated structure, the tape ToF has a printing region D1 configured of four layers including the print background layer 25, base layer 21, bonding adhesive layer 22, and release layer 24; and a non-printing region D2 configured of three layers including the base layer 21, bonding adhesive layer 22, and release layer 24. In this modification, the print head 7 forms the printed image R including the text "A01", "A02", "A03", . . . on the print background layer 25, as described earlier.

Figure 14C:
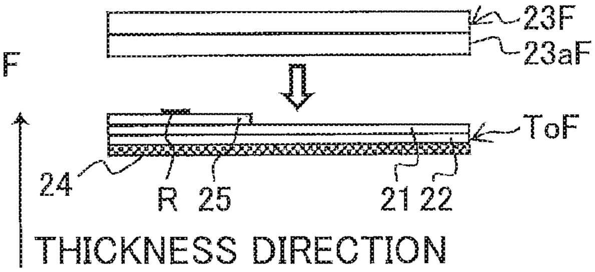
FIG. 14C is a lateral cross-sectional view illustrating bonding of a cover film to the tape according to the sixth modification.

As shown in FIG. 14C, the adhesive layer 23*a*F is provided on one side of the cover film 23F relative to the thickness direction (the bottom side in FIG. 14C) in this modification. After the printed image R is formed in the print background layer 25, as described above, the tape ToF is bonded to the cover film 23F through the adhesive layer 23*a*F to form the printed tape TF. That is, when bonding the cover film 23F to the tape ToF, the adhesive layer 23*a*F on the cover film 23F adheres to the top side of the print background layer 25 in the thickness direction of the tape ToF and to the top side of the base layer 21 in a region that the print background layer 25 is not present.

Figure 14D:
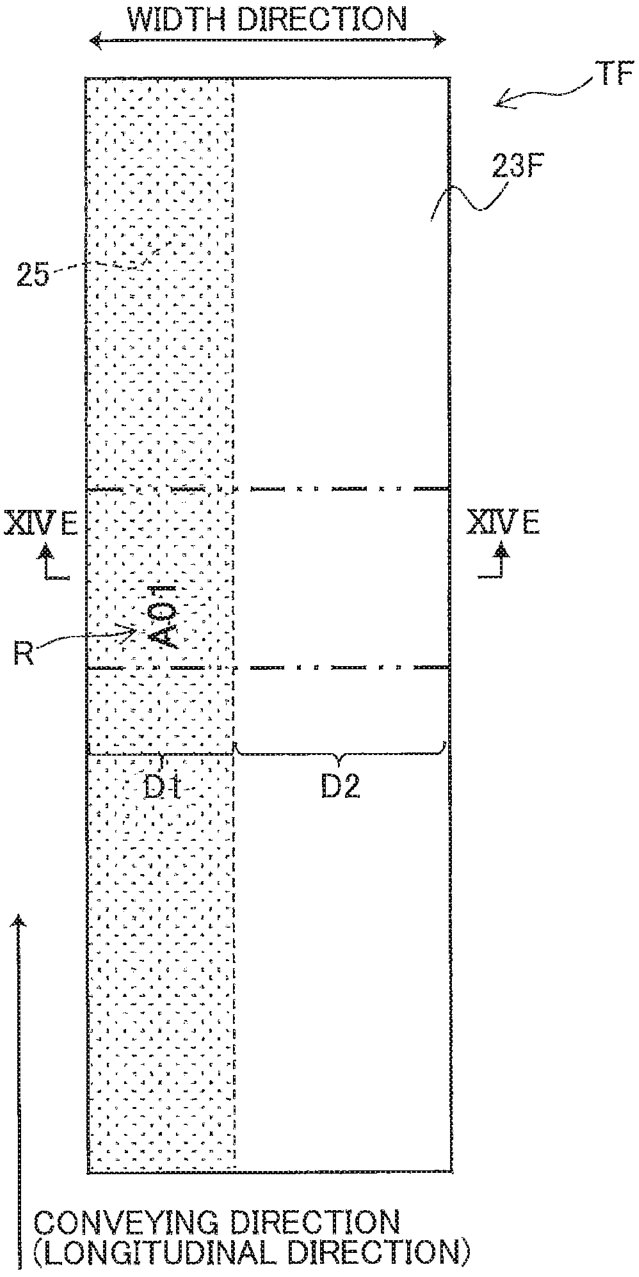
FIG. 14D is a plan view of a printed tape according to the sixth modification.
Figure 14E:
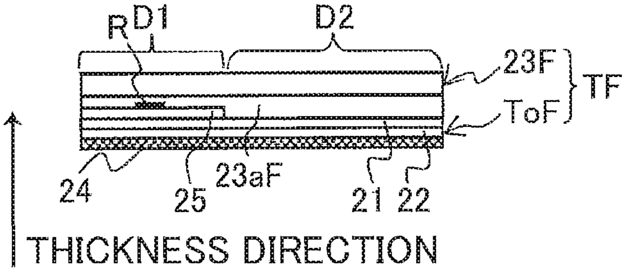
FIG. 14E is a lateral cross-sectional view of the printed tape according to the sixth modification taken along a line XIVE-XIVE shown in FIG. 14D.

FIGS. 14D and 14E show a detailed configuration of the printed tape TF. As shown in FIGS. 14D and 14E, when the cover film 23F and tape ToF are bonded together to form the printed tape TF according to the sixth modification, the printing region D1 in the printed tape TF has a laminated structure that includes, in order from one side in the thickness direction (the bottom side in FIG. 14E) toward the other side (the top side in FIG. 14E), the release layer 24, bonding adhesive layer 22, base layer 21, print background layer 25 that includes the printed image R, and cover film 23F that includes the adhesive layer 23*a*F. Further, the non-printing region D2 has a laminated structure including the release layer 24, bonding adhesive layer 22, base layer 21, and cover film 23F that includes the adhesive layer 23*a*F in order from the bottom side to the top side in the thickness direction.

<Detailed Description of the Printed Label>

Figure 15A:
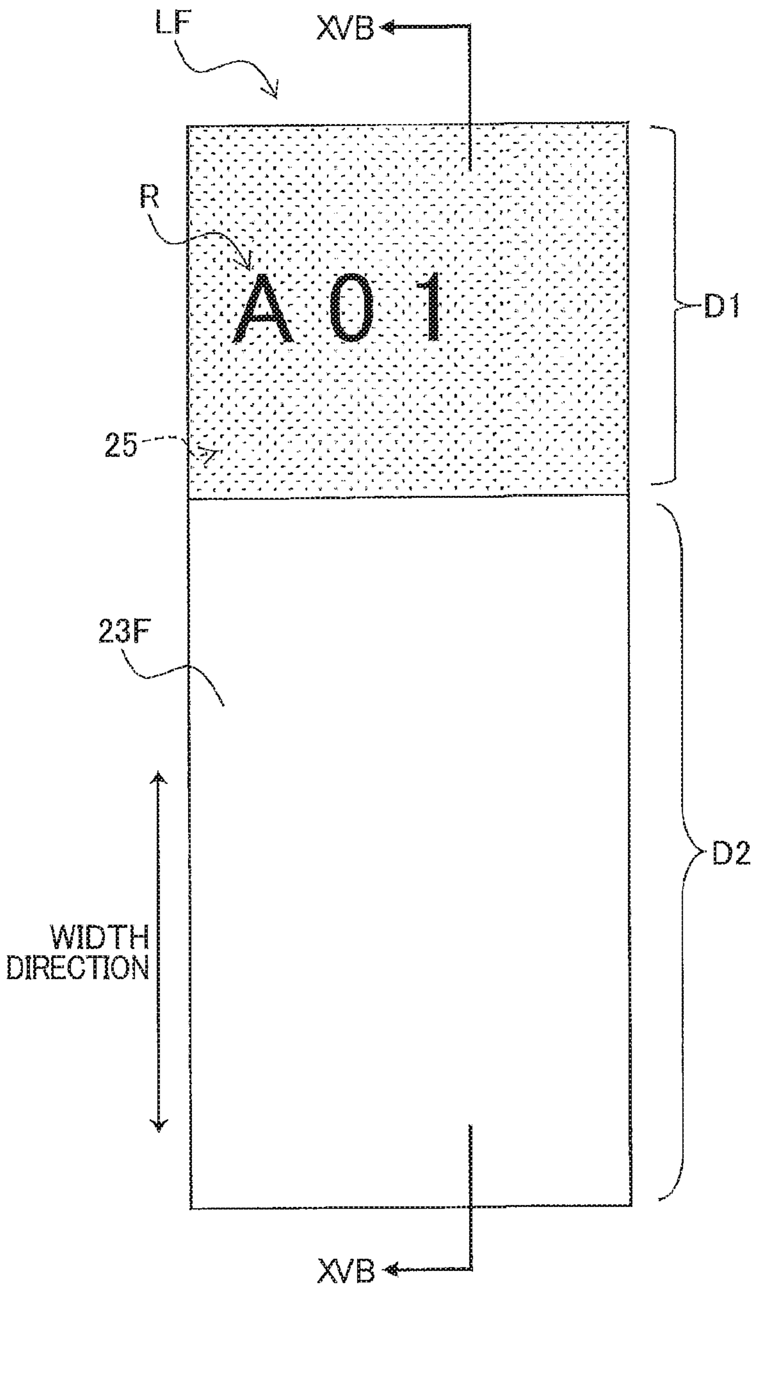
FIG. 15A is a plan view of a printed label according to the sixth modification.
Figure 15B:
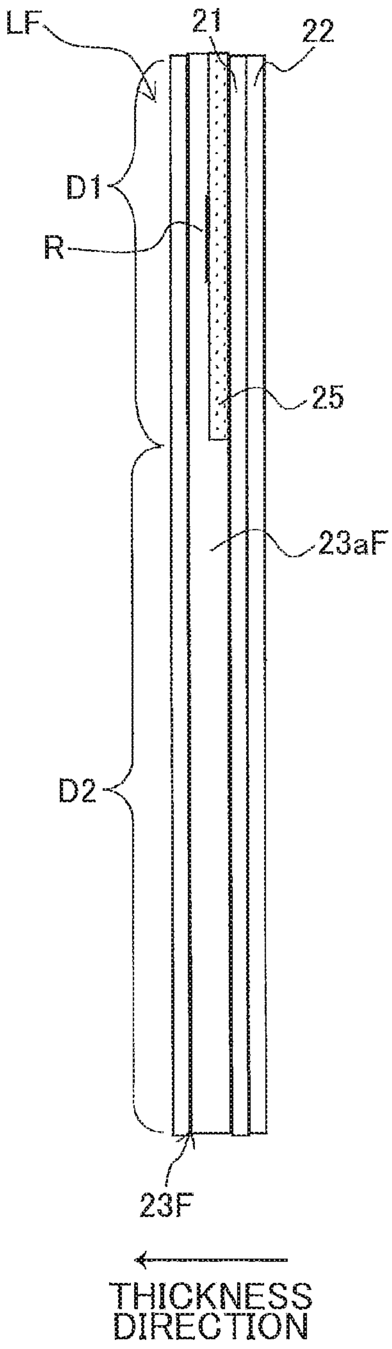
FIG. 15B is a longitudinal cross-sectional view of the printed label according to the sixth modification taken along a line XVB-XVB shown in FIG. 15A.

By cutting the printed tape TF with the cutter 9, the label-creating device 1F according to the sixth modification creates the printed label LF. As shown in FIGS. 15A and 15B, the printed label LF presents the text "A01" printed on the print background layer 25 with the color of the print background layer 25 beneath the transparent cover film 23F serving as the background color. Hence, the printing region D1 in the printed label LF has a laminated structure including the cover film 23F provided with the adhesive layer 23*a*F, the print background layer 25 provided with the printed image R, the base layer 21, and the bonding adhesive layer 22. The non-printing region D2 has a laminated structure including the cover film 23F provided with the adhesive layer 23*a*F, the base layer 21, and the bonding adhesive layer 22.

The structure of the sixth modification can obtain the same technical advantages as the depicted embodiment.

(7) Printing in a Heat-Sensitive Layer of the Cover Film

<Label-Creating Device>

Figure 16:
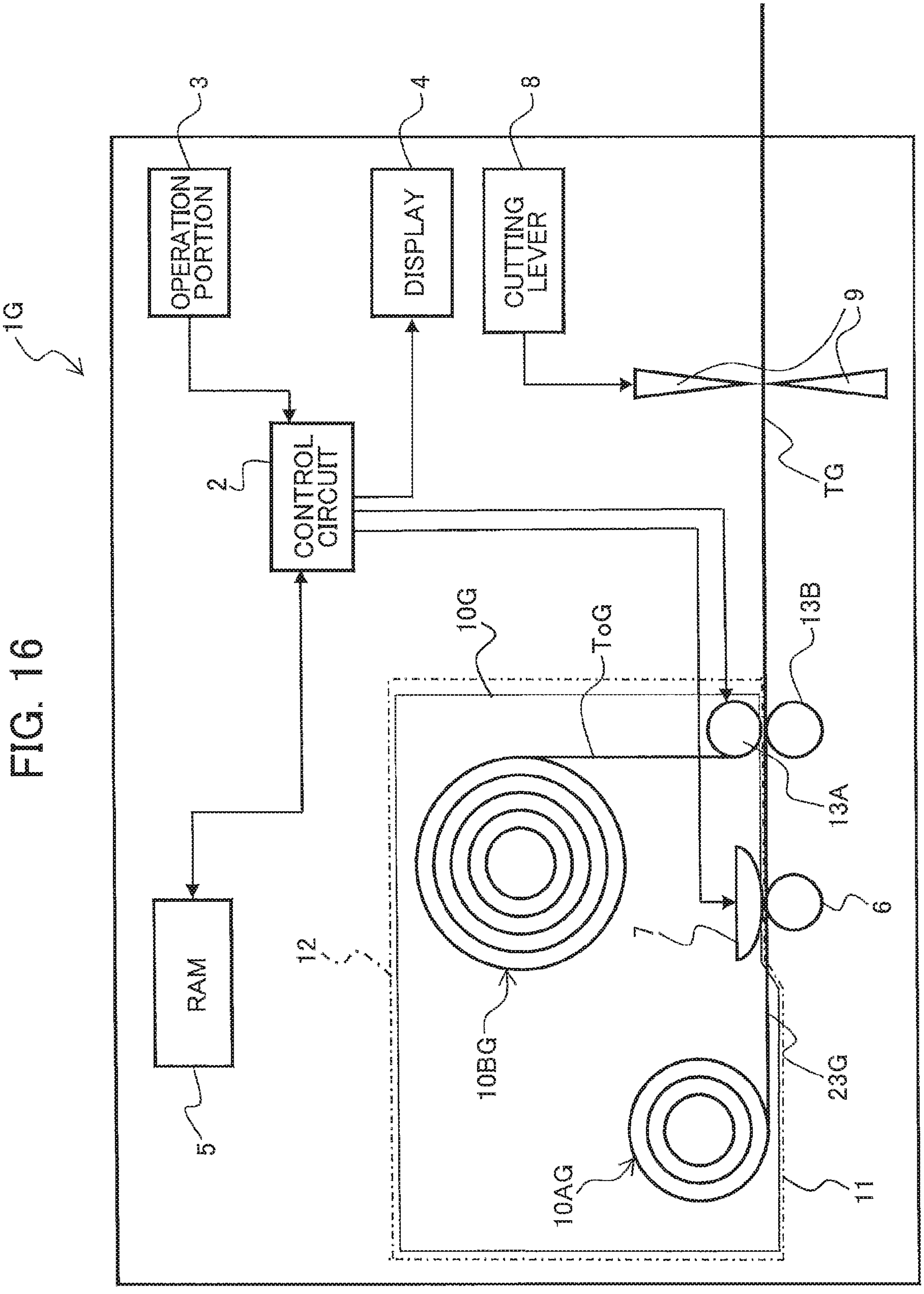
FIG. 16 is a schematic diagram illustrating an overall configuration of a label-creating device apparatus according to a seventh modification to the embodiment.

FIG. 16 shows a functional configuration of a label-creating device 1G according to a seventh modification to the embodiment. FIG. 16 corresponds to FIG. 1 of the embodiment.

As shown in FIG. 16, a tape cartridge 10G is detachably mounted in the cartridge holder 12 in place of the tape cartridge 10 according to the embodiment. The tape cartridge 10G holds tape rolls 10AG and 10BG in the housing 11. Note that the tape rolls 10AG and 10BG are depicted as concentric circles in the drawing for simplification, but are actually tape wound into rolls. A cover film 23G is wound about the tape roll 10AG, and a tape ToG (see FIGS. 17A and 17B described later) is wound about the tape roll 10BG. The cover film 23G includes a transparent film 23*a*G and a heat-sensitive layer 23*b*G (see FIGS. 17C and 17E). The tape ToG is identical to the tape To of the embodiment, except that the tape ToG does not include the print background layer 25 of the embodiment. Since printing in this modification is performed without the ink ribbon IR as will be described later, the tape cartridge 10G does not include the ink ribbon supply roll 14A and ink ribbon take-up roll 14B of the embodiment.

After the tape cartridge 10G has been mounted in the cartridge holder 12 of the label-creating device 1G, the cover film 23G paid out from the tape roll 10AG is interposed between the conveying roller 6 and print head 7. The print head 7 can form the desired printed image R (see FIGS. 18A and 18B) by applying heat to the heat-sensitive layer 23*b*G of the cover film 23G conveyed by the conveying roller 6 in order to develop color. The cover film 23G having the heat-sensitive layer 23*b*G in which the printed image R was formed is compressed against the tape ToG paid out from the tape roll 10BG by the pressure rollers 13A and 13B to form a printed tape TG (see FIGS. 17D and 17E). Subsequently, the printed tape TG is cut by the cutter 9 to create a printed label LG (see FIGS. 18A and 18B).

<Detailed Description of the Tape>

Figure 17A:
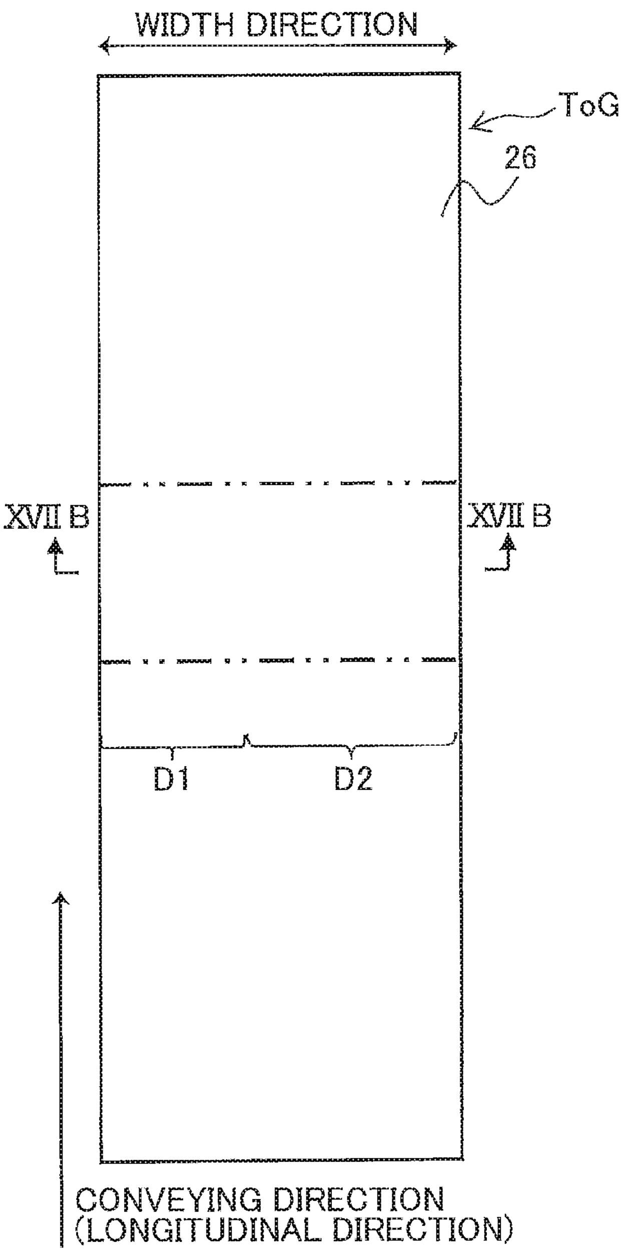
FIG. 17A is a plan view of a tape according to the seventh modification prior to printing.
Figure 17B:
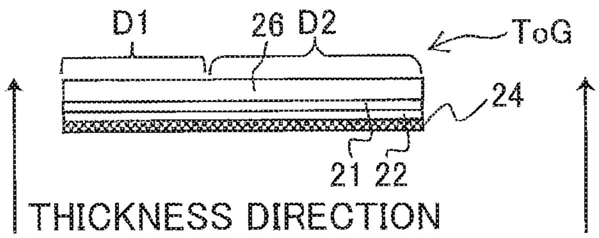
FIG. 17B is a lateral cross-sectional view of the tape according to the seventh modification taken along a line XVIIB-XVIIB shown in FIG. 17A.

FIGS. 17A and 17B show a detailed structure of the tape ToG. As shown in FIGS. 17A and 17B, the tape ToG according to the seventh modification has a configuration that differs from the tape To of the embodiment in the omission of the print background layer 25. Thus, the tape ToG is configured of the release layer 24, bonding adhesive layer 22, base layer 21, and bonding adhesive layer 26 laminated in order from one side in the thickness direction (the bottom side in FIG. 17B) toward the other side (the top side in FIG. 17B).

Figure 17C:
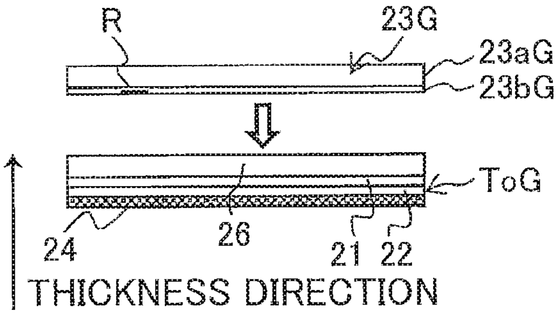
FIG. 17C is a lateral cross-sectional view illustrating bonding of a cover film to the tape according to the seventh modification.

As in the embodiment, the printed image R is configured of the text "A01", "A02", "A03", . . . . As shown in FIG. 17C, the print head 7 forms the printed image R in the heat-sensitive layer 23*b*G of the cover film 23G according to the seventh modification. The cover film 23G in which the printed image R is formed is bonded to the tape ToG through the bonding adhesive layer 26 to form the printed tape TG.

Figure 17D:
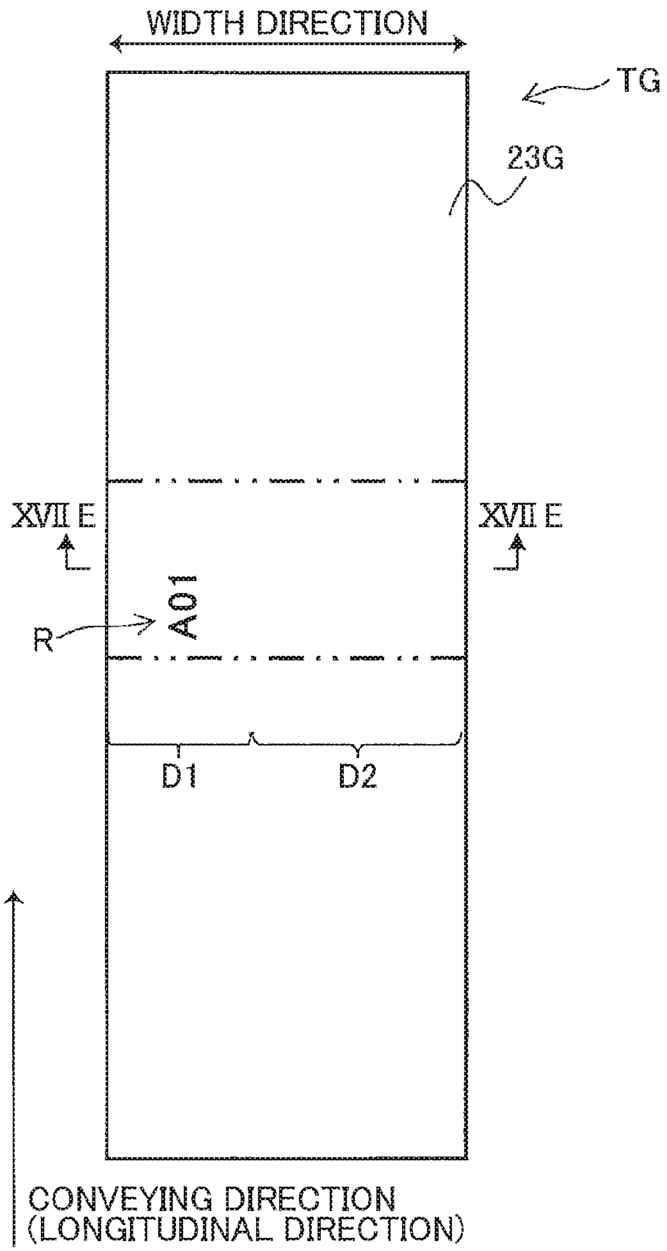
FIG. 17D is a plan view of a printed tape according to the seventh modification.
Figure 17E:
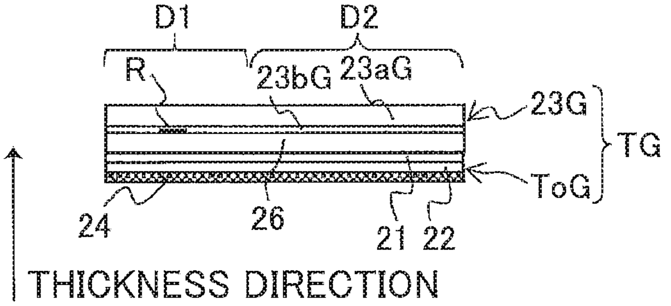
FIG. 17E is a lateral cross-sectional view of the printed tape according to the seventh modification taken along a line XVIIE-XVIIE shown in FIG. 17D.

FIGS. 17D and 17E show a detailed configuration of the printed tape TG. As shown in FIGS. 17D and 17E, the printed tape TG of the seventh modification formed by bonding together the cover film 23G and tape ToG has a laminated structure that includes the release layer 24, bonding adhesive layer 22, base layer 21, bonding adhesive layer 26, and cover film 23G in the printing region D1 arranged in order from one side in the thickness direction (the bottom side in FIG. 17E) to the other side (the top side in FIG. 17E). Here, the cover film 23G includes the heat-sensitive layer 23*b*G having the printed image R formed by color development, and the transparent film 23*a*G. Further, the non-printing region D2 has a laminated structure that includes the release layer 24, bonding adhesive layer 22, base layer 21, bonding adhesive layer 26, and cover film 23G in order from the bottom side to the top side in the thickness direction. Here, the cover film 23G includes the heat-sensitive layer 23*b*G having no color development, and the transparent film 23*a*G.

<Detailed Description of the Printed Label>

Figure 18A:
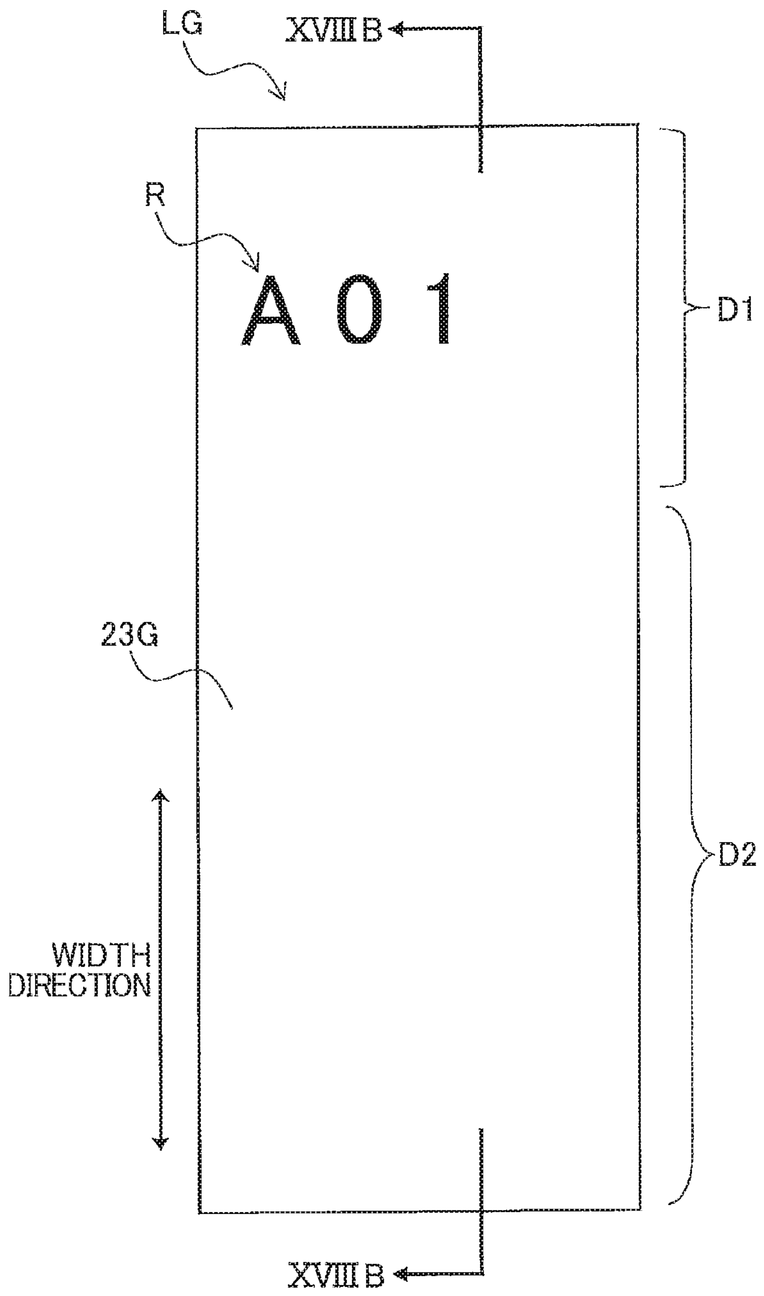
FIG. 18A is a plan view of a printed label according to the seventh modification.
Figure 18B:
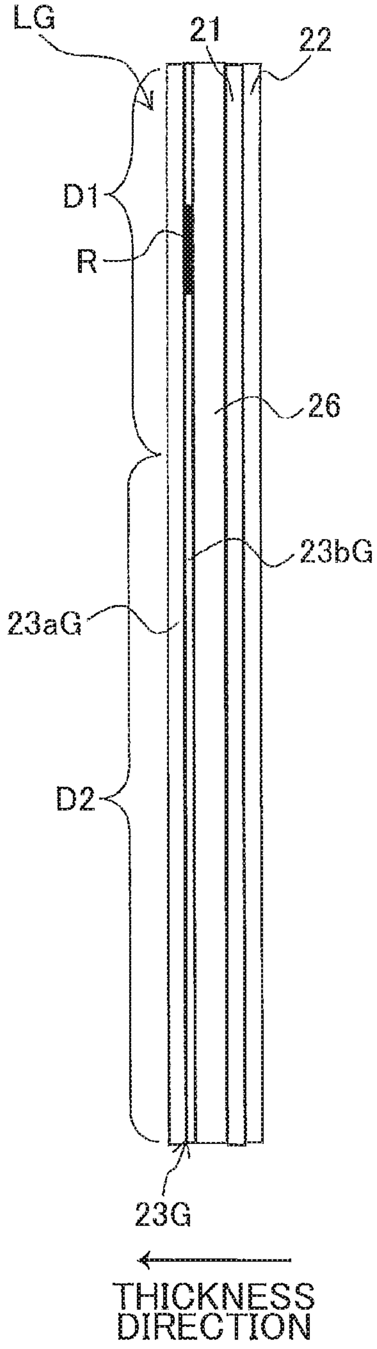
FIG. 18B is a longitudinal cross-sectional view of the printed label according to the seventh modification taken along a line XVIIIB-XVIIIB shown in FIG. 18A.

By cutting the printed tape TG with the cutter 9 as described above, the label-creating device 1G according to the seventh modification creates the printed label LG. As shown in FIGS. 18A and 18B, the printed label LG presents the text "A01" printed in the heat-sensitive layer 23*b*G beneath the transparent film 23*a*G of the cover film 23G. Hence, the printing region D1 in the printed label LG has a laminated structure including the cover film 23G having the heat-sensitive layer 23*b*G in which the printed image R is formed, the bonding adhesive layer 26, the base layer 21, and the bonding adhesive layer 22. The non-printing region D2 has a laminated structure including the cover film 23G with the heat-sensitive layer 23*b*G in which the printed image R is not formed, the bonding adhesive layer 26, the base layer 21, and the bonding adhesive layer 22.

<Technical Advantages of the Seventh Modification>

In the seventh modification, the cover film 23G provided with the heat-sensitive layer 23*b*G is bonded to the tape ToG when creating the printed label LG. Here, the heat-sensitive layer 23*b*G is provided on the side of the cover film 23G that is bonded to the tape ToG. A desired image is printed in the heat-sensitive layer 23*b*G by applying heat inappropriate locations to develop color in the heat-sensitive layer 23*b*G. Thereafter, the tape ToG and cover film 230 are cut with respect to the width direction to create the printed label LG.

As in the embodiment, a relatively long remaining portion Lr is produced in the seventh modification in a case where the object 302 has a relatively small diameter. However, since printing through color development occurs in the heat-sensitive layer 23*b*G, the display portion of the printed image R formed through color development is not included in the remaining portion Lr, provided that a print length for the printed image R is not excessive. Since the tape ToG and the transparent film 23*a*G of the cover film 23G are both transparent, the remaining portion Lr that does not include the heat-sensitive layer 23*b*G in which color development has occurred is visually transparent overall. Hence, by continuing to wrap the remaining portion Lr around the object 302, as described in the embodiment, the display portion having the printed image R is visually recognizable from the outside, even when the display portion is covered by the remaining portion Lr. By covering the display portion with the remaining portion Lr in this way, the remaining portion Lr can protect the display portion (printed image R) from becoming dirty or peeling due to rubbing, as in the embodiment.

Even if the object 302 has a relatively large diameter, the display portion having color developed in the heat-sensitive layer 23*b*G is interposed between the cover film 23G and tape ToG when the tape ToG and cover film 23G are bonded to create the printed label LG. As a result, the display portion (printed image R) can still be protected from dirt and peeling, as described in the embodiment.

When dimensions and sizes are described as “identical,” “equivalent,” or “different” in appearance in the above description, these terms are not meant to be taken in the strict sense. In other words, the terms “identical,” “equivalent,” and different” are intended to allow for design or manufacturing allowances or error and denote “essentially identical,” “essentially equivalent,” and “essentially different.”

The arrows shown in FIGS. 1, 13, and 16 show examples of signal flow, but the directions of signal flow are not limited to these examples.

In addition to the methods and techniques described above in the embodiment and modifications thereto, suitable combinations of these methods and techniques may also be applied.

Although now shown, various other variations may be made without departing from the scope of the present disclosure.

REMARKS

The tape cartridges 10, 10F, 10G are examples of a tape cassette. The tapes To, ToA, ToB, ToC, ToD, ToE, ToF and ToG are examples of a tape. The base layer 21 is an example of a transparent base layer. The print background layer 25 is an example of a background layer. The release layer 24 is an example of a release layer. The cover film 23 is an example of a transparent cover film. The ink ribbon IR is an example of an ink ribbon. The transparent ink layer 27 is an example of a transparent layer. The break line S is an example of a break line. The heat-sensitive layer 23*b*G is an example of a heat-sensitive layer. The transparent film 23*a*G is an example of a transparent film. The cover film 23G is an example of a cover film. The label L, LA, LB, LC, LD, LE, LF and LG are examples of a label. The label-creating device 1, 1F and 1G are examples of a label-creating device. The object 302 is an example of an object.

What is claimed is:

1. A tape cassette for creating a label, the tape cassette comprising:

a housing;

a tape roll accommodated in the housing, the tape roll being configured of a tape wound about a first axis, the tape having a thickness in a thickness direction and a width in a width direction, the tape having a first surface and a second surface opposite each other in the thickness direction, the tape being configured of a plurality of laminated layers comprising:

a transparent base layer;

a background layer having a width smaller than the width of the tape in the width direction; and a release layer constituting the first surface of the tape in the thickness direction;

a transparent cover film roll accommodated in the housing, the transparent cover film roll being configured of a transparent cover film wound about a second axis different from the first axis, the transparent cover film being to be bonded to the second surface of the tape to create the label, the transparent cover film having a printing surface to be bonded to the second surface of the tape; and an ink ribbon roll accommodated in the housing, the ink ribbon roll being configured of an ink ribbon wound about a third axis different from the first axis and the second axis, the ink ribbon containing ink to be transferred to the printing surface of the transparent cover film to form an image thereon only in a region corresponding to the background layer in the width direction, wherein the label has one end portion and another end portion opposite each other with respect to the width direction, wherein the one end portion of the label includes the transparent cover film, the background layer, the transparent base layer, and the release layer, and wherein the another end portion of the label includes the transparent cover film, the transparent base layer, and the release layer.

2. The tape cassette according to claim 1, wherein the background layer, the transparent base layer, and the release layer are laminated in a recited order in the thickness direction of the tape.

3. The tape cassette according to claim 2, wherein the background layer has a widthwise edge in the width direction that is aligned with one widthwise edge of the tape in the width direction, and wherein the plurality of laminated layers of the tape further comprises a transparent layer provided adjacent to the background layer in the width direction.

4. The tape cassette according to claim 2, wherein the background layer is provided at an intermediate region with respect to the width of the tape in the width direction, the intermediate region excluding both widthwise edges of the tape in the width direction.

5. The tape cassette according to claim 1, wherein the transparent base layer, the background layer, and the release layer are laminated in a recited order in the thickness direction of the tape.

6. The tape cassette according to claim 1, wherein the transparent base layer has a width equal to the width of the tape in the width direction, and wherein the width of the background layer is equal to or greater than one-half the width of the transparent base layer in the width direction.

7. The tape cassette according to claim 1, wherein the label is to be attached to an object having a circular cross-section, and wherein the one end portion of the label and the another end portion of the label are configured to be arranged adjacent to each other in a circumferential direction of the object.

8. A method of creating a label with the tape cassette according to claim 1 and a label-creating device, the method comprising:

mounting the tape cassette according to claim 1 on the label-creating device;

transferring the ink of the ink ribbon to the printing surface of the transparent cover film to form an image thereon only in the region corresponding to the background layer in the width direction; and bonding the printing surface of the transparent cover film to the second surface of the tape to create the label having the image formed therein.

9. A method of attaching the label created by the method according to claim 8 to an object having a circular cross-section, wherein the label has a first end portion and a second end portion opposite each other in a longitudinal direction thereof, the first end portion being closer to the image than the second end portion is to the image in the longitudinal direction, the method comprising:

peeling the release layer off the label;

wrapping the first end portion around the object; and continuously wrapping the second end portion around the object to overlap with the first end portion in a radial direction of the object.

* * * * *